(12) United States Patent
Koyama et al.

(10) Patent No.: US 12,000,969 B2
(45) Date of Patent: Jun. 4, 2024

(54) VEHICLE COLLISION DETERMINATION APPARATUS

(71) Applicant: DENSO CORPORATION, Kariya (JP)

(72) Inventors: Yu Koyama, Nisshin (JP); Youhei Suzuki, Nisshin (JP); Dai Kondou, Kariya (JP); Satoru Noro, Kariya (JP); Hideki Ootsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 17/649,870

(22) Filed: Feb. 3, 2022

(65) Prior Publication Data

US 2022/0155428 A1    May 19, 2022

Related U.S. Application Data

(63) Continuation of application No. PCT/JP2020/027069, filed on Jul. 10, 2020.

(30) Foreign Application Priority Data

Aug. 7, 2019  (JP) ................................ 2019-145565

(51) Int. Cl.
*G01S 7/524*  (2006.01)
*G01S 15/931*  (2020.01)

(52) U.S. Cl.
CPC ............ *G01S 7/524* (2013.01); *G01S 15/931* (2013.01)

(58) Field of Classification Search
CPC ...... H04B 1/00; H04B 1/0096; H04B 1/0067; H04B 1/0064; H04B 1/0053; H04B 1/005; H04B 1/0028; H04B 1/0007; H04B 1/0003; H04B 1/02; H04B 1/04; H04B 2001/0408; H04B 1/0458; H04B 1/0475;
(Continued)

(56) References Cited

U.S. PATENT DOCUMENTS 10,416,299 B2 *  9/2019  Schoor ................ G01S 13/0209
2005/0007879 A1 *  1/2005  Nishida ................ B06B 1/0223
367/103
(Continued)

FOREIGN PATENT DOCUMENTS

DE  10106142 A1 *  8/2002  ........... G01S 15/104
DE  10106142 A1     8/2002

*Primary Examiner* — Daniel L Murphy
*Assistant Examiner* — Amie M Ndure
(74) *Attorney, Agent, or Firm* — MASCHOFF BRENNAN

(57) ABSTRACT

In a drive device for driving an ultrasonic transmitter, a drive signal generating unit generates a drive signal for driving the ultrasonic transmitter, based on a base signal having a plurality of unit frequency signals arranged in a time series, corresponding to respective codes forming a code sequence. When a first unit frequency signal and a second unit frequency signal chronologically adjacent to it are switched in a discontinuously switching state that is different from a continuously switching state where the first and second unit frequency signals are switched such that a target frequency for a transmission frequency changes continuously at a substantially constant rate, the drive signal generating unit shifts the frequency in at least a switching portion immediately after start of the second unit frequency signal, in a same direction as a direction of frequency change from the first unit frequency signal to the second unit frequency signal.

12 Claims, 10 Drawing Sheets

(58) Field of Classification Search
CPC .......... H04B 1/0483; H04B 2001/0491; H04B 1/06; H04B 1/10; H04B 1/16; H04B 1/1018; H04B 1/1027; H04B 1/1081; H04B 3/50; H04B 3/52; H04B 3/54; H04B 3/60; H04B 5/20; H04B 13/02; H04B 2215/00; H04B 11/00; H04B 13/00; H04B 1/034; H04B 1/707; H04B 5/00; H04B 1/03; H04B 1/40; H04B 1/7075; H04B 10/116; H04B 10/502; H04B 2201/70715; H04B 7/00; H04B 7/0613; H04B 7/15521; H04B 1/69; H04B 1/71057; H04B 1/7176; H04B 10/516; H04B 17/27; H04B 17/318; H04B 2001/6912; H04B 7/24; G01S 7/524; G01S 7/523; G01S 7/526; G01S 15/931; G01S 15/93; G01S 15/89; B60R 5/02; B60R 5/04; B60R 5/041; B60R 2022/208; B60R 21/0134; B60R 21/01536; B60R 21/01534; B60R 2001/1223; B60R 2001/1253; B60R 2021/0027; B60R 2021/01315; B60R 21/01542; B64D 25/20; B64D 15/20

USPC ........................................................ 367/137
See application file for complete search history.

(56) References Cited

U.S. PATENT DOCUMENTS

| | | | |
|---|---|---|---|
| 2015/0226848 A1* | 8/2015 | Park | G01S 13/584 |
| | | | 342/93 |
| 2016/0047910 A1* | 2/2016 | Oh | G01S 13/08 |
| | | | 342/146 |
| 2017/0023670 A1* | 1/2017 | Jansen | G01S 13/343 |
| 2017/0293025 A1* | 10/2017 | Davis | G01S 7/023 |
| 2019/0113600 A1* | 4/2019 | Melzer | G01S 13/343 |
| 2019/0242972 A1* | 8/2019 | Melzer | G01S 13/931 |
| 2019/0293749 A1* | 9/2019 | Itkin | G01S 13/931 |
| 2019/0317187 A1* | 10/2019 | Meissner | G01S 7/354 |
| 2019/0346563 A1* | 11/2019 | Sugae | G01S 7/527 |
| 2019/0377074 A1* | 12/2019 | Sugae | G01S 15/42 |
| 2020/0124699 A1* | 4/2020 | Meissner | G01S 13/0209 |
| 2020/0191911 A1* | 6/2020 | Meissner | G01S 13/343 |

* cited by examiner

VEHICLE COLLISION DETERMINATION APPARATUS

CROSS-REFERENCE TO RELATED APPLICATION

This application is a continuation application of International Application No. PCT/JP2020/027069 filed Jul. 10, 2020 which designated the U.S. and claims priority to Japanese Patent Application No. 2019-145565 filed on Aug. 7, 2019, the contents of each of which are incorporated herein by reference.

BACKGROUND

Technical Field

The present disclosure relates to an apparatus and a method for driving an ultrasonic transmitter whose transmission frequency is ultrasonic.

Related Art

Devices are known that use ultrasonic sensors to detect objects. When this type of device is mounted to a vehicle and used for obstacle detection, the object detection accuracy may be decreased due to interference or the like. For example, interference may occur when the ultrasonic sensor mounted to the own vehicle receives ultrasonic waves transmitted from ultrasonic sensors mounted to another vehicle located around the own vehicle. Alternatively, interference may occur, for example, when one of a plurality of ultrasonic sensors mounted to the own vehicle receives ultrasonic waves transmitted from another one.

DESCRIPTION OF SPECIFIC EMBODIMENTS

Figure 1:
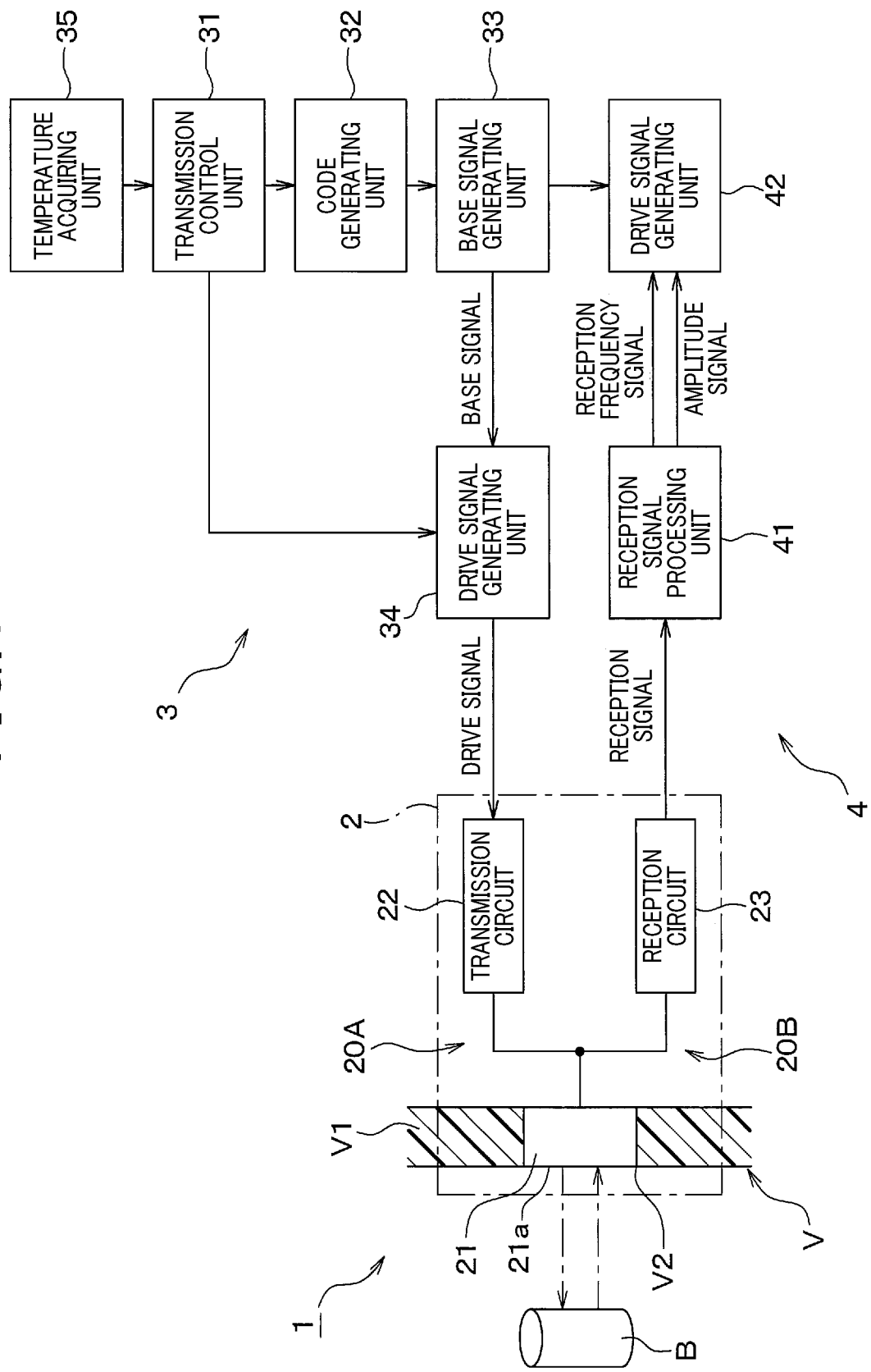
FIG. 1 is a schematic block diagram of an object detection apparatus including a drive device according to one embodiment.

An ultrasonic multi-sensor array as disclosed in DE 101 06 142 A1 includes at least two transmission units and at least one reception unit, and some of the transmission units are capable of operating in parallel.

In the ultrasonic multi-sensor array described in DE 101 06 142 A1, the ultrasonic pulses are encoded to enable parallel operation. Specifically, the frequency of the carrier signal is linearly modulated for individual pulse coding in multiple transmitting units that operate in parallel. That is, the frequency of the carrier signal of a first transmission unit is increased linearly during a pulse duration. That is, the frequency of the carrier signal of the first transmission unit is linearly increased during the pulse duration, while the frequency of the carrier signal of a second transmission unit is linearly decreased during the pulse duration.

With use of the technique disclosed in DE 101 06 142 A1, the ultrasonic sensor mounted to the own vehicle can identify whether the reception wave is a reflected wave of its own transmission wave. Specifically, such identification is based on whether the reception wave includes frequency changes similar to those of the transmission wave. If the desired identification accuracy is achieved, the item of interference as described above can be resolved.

However, there is a need for further improvement of the identification accuracy in object detection using ultrasonic wave transmission and reception, as described above. The present disclosure has been made in light of the circumstances set forth above. The present disclosure provides, for example, a device configuration and a method that can improve the identification accuracy more than before.

One aspect of the present disclosure provides a drive device for driving an ultrasonic transmitter whose transmission frequencies are ultrasonic. The drive device includes: a drive signal generating unit configured to generate a drive signal for driving the ultrasonic transmitter, based on a base signal having a plurality of unit frequency signals arranged in a time series, each of the plurality of unit frequency signals being a frequency signal corresponding to a respective one of a plurality of codes forming a code sequence; and a transmission control unit configured to control output of the drive signal from the drive signal generating unit to the ultrasonic transmitter. The drive signal generating unit is configured to, in response to a first unit frequency signal and a second unit frequency signal chronologically adjacent to and following the first unit frequency signal in the time series, both included in the base signal, being switched in a discontinuously switching state that is different from a continuously switching state where the first unit frequency signal and the second unit frequency signal are switched such that a target frequency for the transmission frequency changes continuously at a substantially constant rate of change from the target frequency corresponding to the first unit frequency signal to the target frequency corresponding to the second unit frequency signal, shift the frequency in at least a switching portion of the second unit frequency signal, immediately after start of the second unit frequency signal, in a same direction as a direction of frequency change from the first unit frequency signal to the second unit frequency signal.

Another aspect of the present disclosure provides a drive method for driving an ultrasonic transmitter whose transmission frequencies are ultrasonic. The drive method includes: generating a drive signal for driving the ultrasonic transmitter, based on a base signal having a plurality of unit frequency signals arranged in a time series, each of the plurality of unit frequency signals being a frequency signal corresponding to a respective one of a plurality of codes forming a code sequence; and in response to a first unit frequency signal and a second unit frequency signal chronologically adjacent to and following the first unit frequency signal in the time series, both included in the base signal, being switched in a discontinuously switching state that is different from a continuously switching state where the first unit frequency signal and the second unit frequency signal are switched such that a target frequency for the transmission frequency changes continuously at a substantially constant rate of change from the target frequency corresponding to the first unit frequency signal to the target frequency corresponding to the second unit frequency signal, shifting the frequency in at least a switching portion of the second unit frequency signal, immediately after start of the second unit frequency signal, in a same direction as a direction of frequency change from the first unit frequency signal to the second unit frequency signal.

In each unit of the present application document, the reference signs in parentheses attached to the components or the like merely indicate examples of the correspondence between the components or the like and the specific components described in relation to the embodiments described below. Therefore, the present disclosure is not limited by the above reference signs.

Embodiments

Hereinafter, embodiments of the present disclosure will now be described with reference to the drawings. Variations applicable to one specific embodiment will be described after the main description of the specific embodiment itself, to avoid impairing the clarity of the description.

Referring to FIG. 1, an object detection apparatus 1 is mounted to a vehicle V as a moving object, and is configured to detect an object B around the vehicle V. The state in which the object detection apparatus 1 is mounted to the vehicle V is hereinafter referred to as a vehicle-mounted state. The vehicle V carrying the object detection apparatus 1 of the present embodiment is hereinafter referred to as an own vehicle.

The object detection apparatus 1 is configured as a so-called sonar, that is, an ultrasonic sensor. Specifically, the object detection apparatus 1 is configured to externally transmit transmission waves that are ultrasonic waves. In addition, the object detection apparatus 1 is configured to detect an object B in the surroundings of the own vehicle and acquire ranging information corresponding to the object B by receiving reflected waves from the object B of the externally transmitted waves.

The object detection apparatus 1 includes a transceiver 2, a drive device 3, and a determination device 4. In the present embodiment, the object detection apparatus 1 is configured such that the transceiver 2, the drive device 3, and the determination device 4 are supported by a single sensor housing (not shown).

That is, the object detection apparatus 1 has an integrated transmission-reception configuration with a single transceiver 2 whose transmission and reception frequencies are ultrasonic. The transceiver 2 is configured to implement a function as an ultrasonic transmitter that externally transmits transmission waves and a function as an ultrasonic receiver that receives reception waves including reflected waves of the transmission waves from an object B.

Specifically, the transceiver 2 includes a transmitting unit 20A and a receiving unit 20B. The transceiver 2 includes a single transducer 21. The transmitting unit 20A and the receiving unit 20B are configured to implement a transmitting function and a receiving function respectively using the shared transducer 21. The transducer 21 has a configuration as a resonant ultrasonic microphone, in which an electrical-mechanical energy conversion element, such as a piezoelectric element, is built into a substantially cylindrically shaped microphone housing.

In the vehicle-mounted state, the transducer 21 is disposed facing the outer surface of the own vehicle, such that the transmission waves can be transmitted to outside the own vehicle and reflected waves can be received from outside the own vehicle. Specifically, the transducer 21 is mounted in an outer plate member V1 such that, in the vehicle-mounted state, the transducer surface 21a is exposed to an exterior space of the own vehicle through a mounting hole V2 that is a hole formed in the outer plate member V1 of the own vehicle. The outer plate member V1 is, for example, a bumper or a body panel, and is formed of a synthetic resin or metal plate material. The transducer surface 21a is an outer surface of the microphone housing in the transducer 21, and is provided to serve as a transmitting surface for the transmission waves and a receiving surface for the reception waves.

The transceiver 2 includes the transducer 21, a transmission circuit 22, and a reception circuit 23. The transducer 21 is electrically connected to the transmission circuit 22 and the reception circuit 23. The transmitting unit 20A is formed of the transducer 21 and the transmission circuit 22. The receiving unit 20B is formed of the transducer 21 and the reception circuit 23.

The transmission circuit 22 is provided to drive the transducer 21 based on the input drive signal to cause the transducer 21 to transmit a transmission wave of a frequency corresponding to the frequency of the drive signal. The frequency of the drive signal is hereinafter referred to as a drive frequency. The frequency of the reception wave is hereinafter referred to as a reception frequency.

Specifically, the transmission circuit 22 includes a digital-to-analog conversion circuit and the like. That is, the transmission circuit 22 is configured to generate an element-input signal by applying signal processing, such as digital-to-analog conversion, to the drive signal output from the drive signal generating unit 34. The element-input signal is an AC voltage signal for driving the transducer 21. The transmission circuit 22 is configured to excite the transducer surface 21a and externally transmit a transmission wave by applying the generated element-input signal to the transducer 21 and driving the electrical-mechanical energy conversion element in the transducer 21.

The reception circuit 23 is provided to generate a reception signal corresponding to a result of reception of the reception wave by the transducer 21 and outputs it to the reception signal processing unit 41. Specifically, the reception circuit 23 includes an amplifying circuit, an analog-to-digital conversion circuit and the like. That is, the reception circuit 23 is configured to generate the reception signal by applying signal processing, such as amplification and analog-to-digital conversion, to the element-output signal output by the transducer 21. The element-output signal is an AC voltage signal generated by the electric-mechanical energy conversion element provided in the transducer 21 when the transducer surface 21a is excited by reception of the reception wave. The reception circuit 23 is configured to output the generated reception signal, which includes information about the amplitude and frequency of the reception wave, to the reception signal processing unit 41.

As above, the transceiver 2 is configured to transmit transmission waves and receive reflection waves from the object B as reception waves, thereby generating reception signals according to a distance between the transducer 21 and the object B and the reception frequencies. The reception waves that the transceiver 2 receives as reflected waves of the transmission waves transmitted by the same transceiver 2 are hereinafter referred to as "proper waves." The reception waves arising from transmission waves from other devices are hereinafter referred to as "improper waves." The "other devices" may include other transceivers 2 mounted to the own vehicle.

The drive device 3 that drives the transceiver 2 is configured to control a transmission state of the transmission wave from the transceiver 2. In the present embodiment, the drive device 3 is provided in a control circuit (not shown) that controls overall object detection operation in the object detection apparatus 1. The drive device 3 includes a transmission control unit 31, a code generating unit 32, a base signal generating unit 33, a drive signal generating unit 34, and a temperature acquiring unit 35.

The transmission control unit 31 is provided to determine the waveform and the transmission timing of the transmission wave by controlling overall operation of the drive device 3. That is, the transmission control unit 31 determines a transmission code sequence, which is a code sequence to be assigned to the transmission wave. The "code sequence" is formed of a plurality of codes. Specifically, each code in the code sequence may be, for example, any one of three types of codes "1", "0" and "−1", and the code sequence has a structure such that a plurality of codes are arranged in a sequence, such as "1, −1". In the present embodiment, the transmission control unit 31 selects one of a plurality of predefined code sequences as the transmission code sequence.

The code generating unit 32 is provided to output the transmission code sequence determined by the transmission control unit 31 to the base signal generating unit 33. Specifically, the code generating unit 32 outputs, for example, a code sequence "1, 0" in response to the transmission control unit 31 determining the transmission code sequence to be a "code sequence F1", and a code sequence "1, 1" in response to the transmission control unit 31 determining the transmission code sequence to be a "code sequence F2". The base signal generating unit 33 is provided to generate a base signal corresponding to the transmission code sequence and output it to the drive signal generating unit 34. The base signal is a signal in which unit frequency signals are arranged in a time series. Each unit frequency signal is a frequency signal corresponding to a respective one of the plurality of codes in the transmission code sequence. The "frequency signal" is a signal that indicates a frequency modulation mode, i.e., a mode of change of the frequency with time. Specifically, for example, an increasing-in-frequency signal whose frequency increases during a predefined time is set as a unit frequency signal corresponding to the code "1". A decreasing-in-frequency signal whose frequency decreases during the predefined time is set as a unit frequency signal corresponding to the code "−1". A CW signal whose frequency is constant during a predefined time period is set as a unit frequency signal corresponding to the code "0". CF is an abbreviation for continuous frequency.

The drive signal generating unit 34 is provided to generate a drive signal based on a control signal received from the transmission control unit 31 and the base signal generated by the base signal generating unit 33. The drive signal is a signal for driving the transceiver 2, that is, the transmitting unit 20A, to cause the transducer 21 to transmit a transmission wave. For example, the drive signal is a pulsed signal having a frequency in the ultrasonic band. Specific examples of the drive signal will be described in the section entitled "Overview of Operations" below.

The control signal generated and output by the transmission control unit 31 includes waveform correction information for determining a final waveform of the drive signal and a timing signal for controlling the transmission timing of the transmission wave. That is, the drive signal generating unit 34 is configured to generate the drive signal based on the frequency signal generated by correcting the base signal with the waveform correction information corresponding to a code shift mode of the transmission code sequence determined by the transmission control unit 31. Details of the waveform correction information will be described in the section entitled "Outline of Operations" below. The drive signal generating unit 34 is provided to output the drive signal to the transmitting unit 20A at a predefined timing based on the timing signal.

The temperature acquiring unit 35 is provided to acquire the operating temperature of the object detection apparatus 1, namely the transceiver 2. Specifically, the temperature acquiring unit 35 is configured to receive, via an on-board network (not shown), a detected value of the outside temperature by an outside temperature sensor (not shown) mounted to the vehicle V.

The temperature acquiring unit 35 is provided to output the acquired operating temperature to the transmission control unit 31. The transmission control unit 31 sets waveform correction information according to the acquired operating temperature. Details of setting of the waveform correction information according to the operating temperature will be described in the section "Overview of Operations" below.

The determination device 4 is configured to perform a detection determination process for an object B based on the reception signal. Specifically, the determination device 4 includes the reception signal processing unit 41 and an object detecting unit 42.

The reception signal processing unit 41 is configured to generate an amplitude signal and a reception frequency signal by applying a FFT or the like to the reception signal. FFT is an abbreviation for Fast Fourier Transform. The amplitude signal is a signal corresponding to the amplitude of the reception wave. The reception frequency signal is a frequency signal of the reception wave, that is, a signal corresponding to the reception frequency. That is, the reception frequency signal is a signal corresponding to a waveform pattern related to encoding, in the reception signal. The reception signal processing unit 41 is provided to output the generated amplitude signal and reception frequency signal to the object detecting unit 42.

The object detecting unit 42 is provided to detect an object B based on the amplitude signal and the reception frequency signal acquired from the reception signal processing unit 41. Specifically, the object detecting unit 42 is provided to determine whether the reception wave is a proper wave based on a predefined reference signal and the acquired reception frequency signal. In addition, in response to determining that the reception wave being a proper wave, the object detecting unit 42 detects the presence of the object B and a distance between the transducer 21 and the object B based on the acquired amplitude signal.

Overview of Operations

An overview of the operations according to the configuration of the present embodiment will now be described with reference to drawings, together with typical example operations and advantages provided by this configuration.

In response to a predefined object detection condition being met, the object detection apparatus 1 initiates an object detection operation. The object detection condition may include, for example, at least one of a condition that the travel speed of the own vehicle is within a predefined range, and a condition that the shift position of the own vehicle is any one of driving positions including a reversing position, and the like. In response to a predefined object detection condition being not met, the object detection apparatus 1 terminates the object detection operation.

Upon initiation of the object detection operation, the transmission control unit 31 determines a transmission code sequence that is a code sequence to be assigned to the transmission wave. The transmission control unit 31 outputs the determined transmission code sequence to the code generating unit 32. The code generating unit 32 outputs the transmission code sequence determined by the transmission control unit 31 to the base signal generating unit 33. The base signal generating unit 33 generates a base signal corresponding to the transmission code sequence output from the code generating unit 32 and outputs it to the drive signal generating unit 34.

Specifically, for example, when the transmission control unit 31 determines the transmission code sequence to be a "code sequence F1", the code generating unit 32 outputs the code sequence "1, 0" as the transmission code sequence. Then, the base signal generating unit 33 generates a base signal corresponding to the code sequence "1, 0". Such a base signal is formed by arranging in a time series an increasing-in-frequency signal, which is a unit frequency signal corresponding to the code "1" of the first bit, and a CW signal, which is a unit frequency signal corresponding to the code "0" of the second bit.

In response to the object detection condition being met, the transmission control unit 31 determines whether the transmission timing is reached every predefined cycle. The predefined cycle is, for example, a cycle of several hundred milliseconds. The determination as to whether the transmission timing is reached is made using a timer or other timer means (not shown). In response to the transmission timing being reached, the transmission control unit 31 outputs a control signal to the drive signal generating unit 34. That is, the transmission control unit 31 controls outputting of the drive signal from the drive signal generating unit 34 to the transceiver 2.

Upon receiving the base signal and the control signal, the drive signal generating unit 34 generates a drive signal and outputs it to the transmitting unit 20A, that is, the transmission circuit 22. The transmission circuit 22 drives the transducer 21 based on the input drive signal. Then, the transducer 21 transmits a transmission wave that is an ultrasonic wave of a frequency corresponding to the frequency of the drive signal to outside the own vehicle. The transmission wave is thereby transmitted at the predefined transmission timing.

In a predefined receivable period during the object detection operation, the object detection apparatus 1 performs the reception operation. In the integrated transmission-reception configuration of the present embodiment, the receivable period is a time period between the end of transmission of a transmission wave and the subsequent transmission timing immediately after the end of the transmission wave, excluding a dead zone due to effects of echo and the like. In the receivable period, the transducer 21 outputs an element-output signal that is an AC voltage signal corresponding to the amplitude and frequency of the reception wave.

The reception circuit 23 generates a reception signal by applying signal processing, such as amplification and analog-to-digital conversion, to the element-output signal. The reception signal processing unit 41 generates an amplitude signal and a reception frequency signal by applying a FFT or the like to the reception signal. The reception signal processing unit 41 outputs the generated amplitude signal and the generated reception frequency signal to the object detecting unit 42.

The drive signal is frequency modulated according to each of the codes in the transmission code sequence determined by the transmission control unit 31. The transmission frequency that is the frequency of the transmission wave corresponds to the drive frequency that is the frequency of the drive signal. Therefore, the transmission frequency will have frequency changes corresponding to temporal changes in the drive frequency as a characteristic corresponding to the identifiability. Therefore, if the reception wave is a proper wave, the reception frequency should have the same characteristic as the transmission frequency in the frequency modulation mode. The "frequency modulation modes" include a modulation-free mode or CW.

Therefore, the object detecting unit 42 determines whether the reception wave is a proper wave based on the reception frequency signal output from the reception signal processing unit 41. Specifically, the object detecting unit 42 compares the reception frequency signal corresponding to the waveform pattern in the reception signal with the reference signal corresponding to the transmission code sequence determined by the transmission control unit 31. This makes it possible to identify whether the reception wave is a proper wave, that is, a reflected wave of the own transmission wave. When the reception wave is a proper wave, the object detecting unit 42 detects the presence of an object B and the distance between the transducer 21 and the object B based on the amplitude signal output from the reception signal processing unit 41.

As described above, the transmission wave is encoded so as to be identifiable. As an encoding method, encoding with a plurality of bits, in which each code corresponding to a frequency modulation mode, is used. Therefore, the object detection apparatus 1 and the object detection method performed by the object detection apparatus 1 enables improvement of the identification accuracy as compared with the conventional techniques.

Figure 2A:
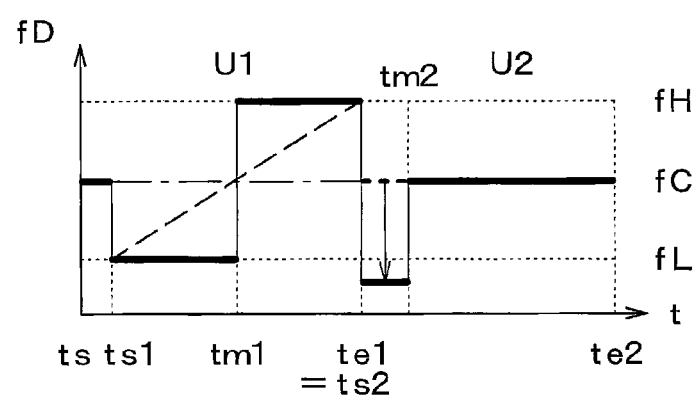
FIG. 2A is a timing chart illustrating transmission and reception frequency characteristics in an example of a drive signal output by a drive signal generating unit illustrated in FIG. 1.
Figure 2A:
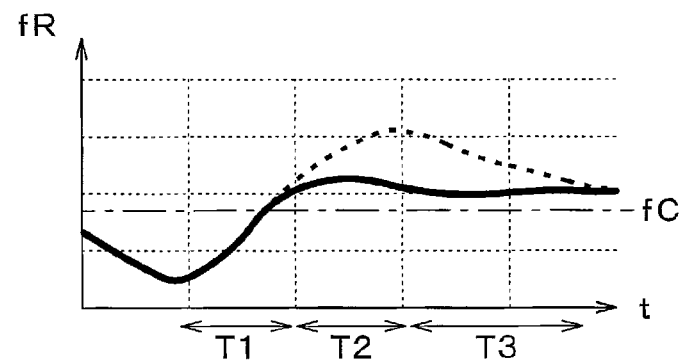
Figure 2B:
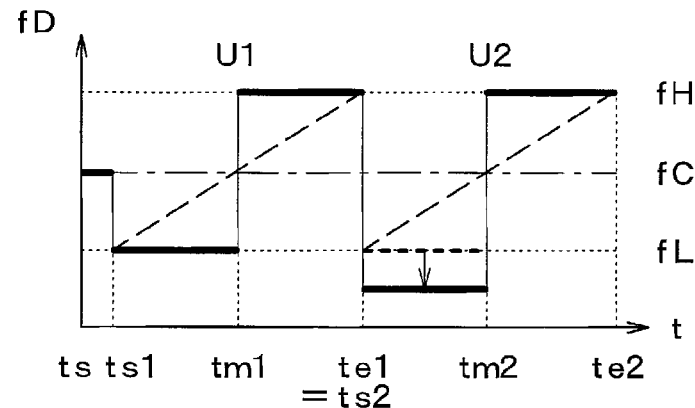
FIG. 2B is a timing chart illustrating transmission and reception frequency characteristics in another example of a drive signal output by a drive signal generating unit illustrated in FIG. 1.
Figure 2B:
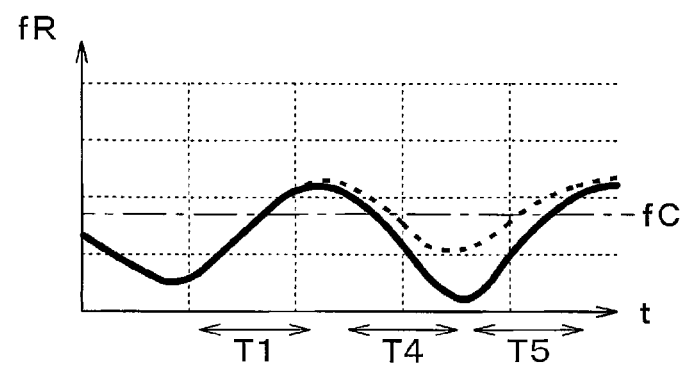

FIG. 2A illustrates changes with time in the drive frequency and the reception frequency corresponding to the code sequence "1, 0". In FIG. 2A, the horizontal axis t indicates time. In the upper timing chart of FIG. 2A, the vertical axis fD indicates the drive frequency. The dashed line indicates target frequencies, that is, target values of the transmission frequency. In the lower timing chart of FIG. 2A, the vertical axis fR indicates the reception frequency. Similarly, FIG. 2B illustrates changes with time in the drive frequency and the reception frequency corresponding to the code sequence "1, 1". The definition of the vertical and horizontal axes in FIG. 2B is the same as in FIG. 2A.

The transceiver 2 including the transducer 21, which is a resonant ultrasonic microphone, has the same characteristics as a bandpass filter. That is, the frequency band suitable for transmission and reception by the transceiver 2 is limited to a width centered at the resonance frequency fC with its half width of a few percent of the frequency fC. Thus, a predefined transmission and reception frequency band is set for the transceiver 2.

The transmission and reception frequency band is a range such that S=0 to Sb [dB], where the output power or sensitivity is S and S=0 [dB] at the resonance frequency fC. That is, the transmission and reception frequency band that is a frequency range suitable for transmission and reception by the transceiver 2 is a range between the upper limit frequency fH and the lower limit frequency fL such that S=0 to Sb [dB]. Sb is typically, for example, −3 [dB]. The sensitivity is the sensitivity when the transceiver 2 is used as a receiver. Such a transmission and reception frequency band may also be referred to as a "resonance band", a "−3 dB band", or a "3 dB band". fL<fC<fH. fL−fC≈fC−fH.

Therefore, in the present embodiment, the target frequency corresponding to the code "1" is set to change in an "up-chirp" manner such that the frequency linearly increases from the lower limit frequency fL to the upper limit frequency fH with time as indicated by the dashed right-upward lines in FIGS. 2A and 2B. The target frequency corresponding to the code "−1" is set to change in a "down-chirp" manner such that the frequency linearly decreases from the upper limit frequency fH to the lower limit frequency fL with time. The target frequency corresponding to the code "0" is set to be constant at the resonance frequency fC.

Therefore, the increasing-in-frequency signal that is the unit frequency signal corresponding to the code "1" has a frequency characteristic such that the drive frequency increases from the lower limit frequency fL to the upper limit frequency fH. The decreasing-in-frequency signal that is the unit frequency signal corresponding to the code "−1" has a frequency characteristic such that the drive frequency decreases from the upper limit frequency fH to the lower limit frequency fL. The CW signal that is the unit frequency signal corresponding to the code "0" has a frequency characteristic such that the drive frequency is constant at the resonance frequency fC.

The resonant transceiver 2 has poor frequency compliance at drive frequencies away from the resonant frequency fC. Thus, as illustrated in FIGS. 2A and 2B, when the first bit is different from the code "0", the drive frequency is set to be constant at the resonance frequency fC between the preburst start time is before the first start time ts1 and the first start time ts1. The first start time ts1 is the start time of the first unit frequency signal U1 corresponding to the first bit. That is, the transceiver 2 is driven at the resonant frequency fC for a short time prior to drive by the first unit frequency signal U1 that starts at a drive frequency that is away from the resonant frequency fC. The frequency compliance can thereby be improved.

Furthermore, in the present embodiment, the increasing-in-frequency signal corresponding to the code "1" has a square-wave-like frequency characteristic such that the frequency changes in a stepwise manner from the lower limit frequency fL to the upper limit frequency fH. The decreasing-in-frequency signal corresponding to the code "−1" has a square-wave-like frequency characteristic such that the frequency changes in a stepwise manner from the upper limit frequency fH to the lower limit frequency fL. frequency characteristics. This leads to improved frequency compliance.

Specifically, in the example illustrated in FIG. 2A, the first unit frequency signal U1 that is an increasing-in-frequency signal has the drive frequency set to be constant at the lower limit frequency fL between the first start time ts1 and the first intermediate time tm1 before the first end time te1. The first end time te1 indicates the end time of the first unit frequency signal U1. The drive frequency is set to be constant at the upper limit frequency fH between the first intermediate time tm1 and the first end time te1. Then, at the first intermediate time tm1 between the first start time ts1 and the first end time te1, the drive frequency changes in a stepwise manner from the lower limit frequency fL to the upper limit frequency fH. This leads to the actual transmission frequency characteristic close to the target frequency characteristic such that the frequency increases linearly with time as indicated by the dashed line in FIG. 2A.

In the example illustrated in FIG. 2A, the first unit frequency signal U1 is set such that the time period between the first start time ts1 and the first intermediate time tm1 is almost equal to the time period between the first intermediate time tm1 and the first end time te1. The second start time ts2 and the second end time tet are respectively the start time and the end time of the second unit frequency signal U2 corresponding to the second bit. In the present embodiment, the first end time te1 and the second start time ts2 are assumed to be almost the same.

Frequency Shifting Process

In the example illustrated in FIG. 2A, the target frequency changes discontinuously from the upper limit frequency fH to the resonance frequency fC at the first end time te1, that is, the second start time ts2, where a code change is made. Thereafter, the target frequency remains constant at the resonance frequency fC. Correspondingly, the base signal has the frequency set to be constant at the resonance frequency fC from the second start time ts2 to the second end time te2. The time period from the second start time ts2 to the second end time te2 is the same as the time period from the first start time ts1 to the first end time te1.

Therefore, in the example of the code sequence "1, 0" illustrated in FIG. 2A, the base signal has the following frequency characteristics. Specifically, the base signal is a time-series of the first unit frequency signal U1 that is a square wave which changes stepwise from the lower limit frequency fL to the upper limit frequency fH at the first intermediate time tm1 and the second unit frequency signal U2 that is a CW wave which is constant at the resonance frequency fC. Therefore, in the second unit frequency signal U2 that is the CW signal corresponding to the code "0", the drive frequency is supposed to be constant at the resonance frequency fC between the second start time ts2 and the second end time te2.

However, the resonant transceiver 2 has poor compliance with switching of drive frequencies. That is, even upon changing the transmission frequency, the transmission frequency actually changes gradually, not instantaneously. The rate of frequency change depends on the characteristics of the transducer 21 and the transmission circuit 22. Thus, when the drive frequency is kept constant at the resonance frequency fC between the second start time ts2 and the second end time te2, the actual transmission frequency and the reception frequency change with time as indicated by the dotted line in the lower timing chart of FIG. 2A. Specifically, the frequency overshoots in the bit change region T2 due to the effect of the frequency change in the frequency rise region T1 where the frequency rises in the first bit, and then in the convergence region T3, the frequency approaches the resonance frequency fC.

Due to such a asymptote from the overshoot frequency to the resonance frequency fC, as indicated by the dotted line in the lower timing chart of FIG. 2A, a waveform pattern in which the frequency decreases appears in the convergence region T3. If such a waveform pattern that the frequency decreases is erroneously determined as a "down-chirp", that is, the code "−1", the identification accuracy may be decreased. Alternatively, the signal length per bit may increase due to the time required for the slope of the frequency change to flatten out like a CW signal. As the signal length increases, it becomes difficult to increase the number of bits per unit time, and there is a limit to the variation of code patterns that can be set.

In view of the above, the drive device 3 according to the present embodiment and the drive method performed the drive device 3 are configured to shift the drive frequency in at least a switching portion of the second unit frequency signal U2, immediately after the second start time ts2, toward lower frequencies than the resonance frequency fC that is the original drive frequency. The direction of frequency shift is the same as the direction of frequency change from the first unit frequency signal U1 to the second unit frequency signal U2 at the first end time te1, that is, the second start time ts2. The drive frequency signal is formed of a frequency-shifted portion of the base signal between the times ts2 and tm2, an unshifted portion of the base signal between the times ts1 and te1, and an unshifted portion of the base signal between the times tm2 and tet.

Specifically, as illustrated in the upper timing chart of FIG. 2A, the drive device and the drive method according to the present embodiment correct the drive frequency in a portion of the second unit frequency signal U2 between the second start time ts2 and the second intermediate time tm2 to lower frequencies. In the example illustrated in FIG. 2A, the time period between the second start time ts2 and the second intermediate time tm2 corresponds to the portion of the second unit frequency signal U2 immediately after the second start time ts2.

According to the present embodiment, the frequency overshoot in the bit-change region T2 is suppressed as much as possible, as indicated by the solid line in the lower timing chart of FIG. 2A. This results in early flattening of the frequency change in the second bit. This improves the accuracy of pattern matching. In addition, making the signal length per bit as short as possible can increase the number of bits per unit time, thereby increasing the number of settable code pattern variations. As a result, when a plurality of sonars are mounted to the own vehicle V, it becomes possible to assign to the respective sonars unique codes, that is, codes that do not overlap with each other, and it becomes easy to identify which sonar transmitted the signal by reception determination. Therefore, the present embodiment makes it possible to improve the identifiability more than before.

FIG. 2B illustrates an example of the code sequence "1, 1". In this example, the target frequency corresponding to the code "1" of the first bit increases linearly from the lower limit frequency fL toward the upper limit frequency fH with time. The target frequency corresponding to the code "1" of the second bit also increases linearly from the lower limit frequency fL toward the upper limit frequency fH with time. At the first end time te1, that is, the second start time ts2 at which the code change is made, the target frequency changes from the upper limit frequency fH to the lower limit frequency fL in a discontinuous manner.

As described above, the frequency characteristics of the target frequencies corresponding to the code "1" of the first bit and the target frequencies corresponding to the code "1" of the second bit are completely identical. Therefore, originally, the first unit frequency signal U1 corresponding to the code "1" of the first bit and the second unit frequency signal U2 corresponding to the code "1" of the second bit should have completely identical waveforms. Specifically, the driving frequency in the second unit frequency signal U2 between the second start time ts2 and the second intermediate time tm2 should be constant at the lower limit frequency fL that is the same as the drive frequency in the first unit frequency signal U1 between the first start time ts1 and the first intermediate time tm1.

However, if the second unit frequency signal U2 is completely identical in waveform to the first unit frequency signal U1, the actual transmission frequency and reception frequency change with time as indicated by the dotted line in the lower timing chart of FIG. 2B. Specifically, the amount of frequency fall in the frequency fall region T4 after the frequency change becomes small due to poor compliance of the resonant transceiver 2 with switching of drive frequencies. As a result, the amount of frequency rise or the rising slope of the frequency in the frequency re-rise region T5 where the frequency rises in the second bit becomes small. Therefore, it becomes difficult to acquire a predefined amount of frequency change corresponding to the code "1" whose frequency changes in an "up-chirp" manner in the second bit. That is, the characteristics of the reception signal become small.

In view of the above, the drive device according to the present embodiment and the drive method performed the drive device are configured to shift the drive frequency in at least a switching portion of the second unit frequency signal U2, immediately after the second start time ts2, toward lower frequencies than the lower limit frequency fL that is the original drive frequency. The direction of frequency shift is the same as the direction of frequency change from the first unit frequency signal U1 to the second unit frequency signal U2 at the first end time te1, that is, the second start time ts2. Specifically, the drive device according to the present embodiment and the drive method performed the drive device correct the drive frequency in the second unit frequency signal U2 between the second start time ts2 and the second intermediate time tm2 toward lower frequencies.

According to the present embodiment, the amount of frequency fall in the frequency fall region T4 becomes large as indicated by the solid line in the lower timing chart of FIG. 2B. As a result, the amount of frequency rise or the rising slope of the frequency in the frequency re-rise region T5 where the frequency rises in the second bit becomes large. Therefore, a predefined amount of frequency change corresponding to the code "1" whose frequency changes in an "up-chirp" manner in the second bit can preferably be acquired. This leads to improvement of the accuracy of pattern matching.

In this way, the first unit frequency signal U1 and the second unit frequency signal U2 chronologically adjacent to and following the first unit frequency signal U1 in the time series may be switched in a discontinuously switching state different from a continuously switching state. In the continuously switching state, the first unit frequency signal U1 and the second unit frequency signal U2 are switched such that the target frequency changes continuously at a substantially constant rate of change from the target frequency corresponding to the first unit frequency signal U1 to the target frequency corresponding to the second unit frequency signal U2. For example, in the discontinuously switching state, the target frequency changes discontinuously or changes in a "broken-line" like manner as the rate of change, or the slope, of the target frequency changes. In the discontinuously switching state, the drive signal generating unit 34 shifts the frequency in at least a switching portion of the second unit frequency signal U2, immediately after the start of the second unit frequency signal U2, in the same direction as the direction of frequency change from the first unit frequency signal U1 to the second unit frequency signal U2.

Specifically, in the example illustrated in FIG. 2A, the target frequency corresponding to the first unit frequency signal U1 increases linearly from the lower limit frequency fL toward the upper limit frequency fH. The target frequency corresponding to the second unit frequency signal U2 is constant at the resonance frequency fC. Switching from the first unit frequency signal U1 to the second unit frequency signal U2 is made in a mode such that the corresponding target frequency changes discontinuously from the upper limit frequency fH to the resonance frequency fC. In addition, the slopes of the target frequency before and after the discontinuous change of the target frequency from the upper limit frequency fH to the resonance frequency fC are different. Thus, the first unit frequency signal U1 and the second unit frequency signal U2 subsequent thereto are switched in the discontinuously switching state.

Therefore, the drive signal generating unit 34 shifts the drive frequency in the second unit frequency signal U2 toward lower frequencies than the original resonant frequency fC between the second start time ts2 and the second intermediate time tm2. The direction of the frequency shift is the same as the direction of frequency change from the first unit frequency signal U1 at the first end time te1 to the second unit frequency signal U2 at the second start time ts2. This is the direction of frequency fall from the upper limit frequency fH toward the resonance frequency fC.

Similarly, in the example illustrated in FIG. 2B, the target frequency corresponding to the first unit frequency signal U1 increases linearly from the lower limit frequency fL toward the upper limit frequency fH. The target frequency corresponding to the second unit frequency signal U2 also increases linearly from the lower limit frequency fL toward the upper limit frequency fH. Switching from the first unit frequency signal U1 to the second unit frequency signal U2 is made in a mode such that the corresponding target frequency changes discontinuously from the upper limit frequency fH to the lower limit frequency fL. Thus, the first unit frequency signal U1 and the second unit frequency signal U2 following it are switched in the discontinuously switching state.

Therefore, the drive signal generating unit 34 shifts the drive frequency in the second unit frequency signal U2 toward lower frequencies than the original lower limit frequency fL between the second start time ts2 and the second intermediate time tm2. The direction of the frequency shift is the same as the direction of frequency change from the first unit frequency signal U1 at the first end time te1 to the second unit frequency signal U2 at the second start time ts2. This is the direction of frequency fall from the upper limit frequency fH toward the lower limit frequency fL.

In the conventional configuration as disclosed in in DE 101 06 142 A1, the rate of frequency change depends on the sensor characteristics, and the frequency does change not instantaneously, but gradually. Therefore, with a short signal length, the features of the reception signals become small and high identifiability can not be achieved, that is, there is a limit to reducing the signal length. On the other hand, even if the signal length is increased in order to increase the features and improve the identifiability, it is difficult to increase the number of bits per unit time, as described above. Specifically, for example, only 1-bit code can be transmitted. Since one vehicle V has eight to twelve sonars installed, it is difficult to achieve satisfactory identifiability with the 1-bit code. According to the drive device and the method of the present embodiment, switching between two chronologically adjacent codes in the time series can be made faster and better. Therefore, overshoot in CW waves can be suppressed and the characteristics of the reception signals in chirp waves can be made more distinctive. In addition, the signal length per bit can be shortened. Therefore, a transmission wave encoded by arranging a plurality of identical or different frequency patterns in a time series can be formed with satisfactory identifiability. Therefore, the present embodiment can provide a device configuration and method by which the identification accuracy can be improved more than before.

In the resonant transceiver 2, the transmission and reception frequency characteristics, including the resonant frequency fC and the transmission and reception frequency band, vary with temperature. Thus, in the present embodiment, the drive signal generating unit 34 sets the frequency shift mode for the second unit frequency signal U2 illustrated in FIGS. 2A and 2B according to the operating temperature of the transceiver 2. That is, the temperature acquiring unit 35 acquires the operating temperature of the object detection apparatus 1, that is, the transceiver 2, and outputs it to the transmission control unit 31. The transmission control unit 31 sets waveform correction information according to the acquired operating temperature.

Specifically, in the example illustrated in FIG. 2A, the transmission control unit 31 sets, according to the operating temperature, a time period between the second start time ts2 and the second intermediate time tm2 in the second unit frequency signal U2. The transmission control unit 31 sets, according to the operating temperature, an amount of drive frequency shift, that is, an amount of correction, from the resonance frequency fC between the second start time ts2 and the second intermediate time tm2. In the example illustrated in FIG. 2B, the transmission control unit 31 sets, according to the operating temperature, an amount of drive frequency shift from the lower limit frequency fL between the second start time ts2 and the second intermediate time tm2.

According to the apparatus and method according to the present embodiment, the effects of the operating temperature on frequency waveforms of the transmission waves can be reduced as much as possible. Therefore, the identification accuracy can be further improved than before.

Multi-Bit Processing

In the above overview of operations using FIG. 2A and FIG. 2B, code changes in each of the first bit and the second bit of the code sequence have mainly been described. In the following, specific processes for code sequences of three or more bits will now be described.

It is possible to assign a code sequence of three or more bits to each transmission wave. Encoding the transmission wave using more than three bits leads to more various settable code patterns and thus to improvement of the identification accuracy.

Example 1

Figure 3:
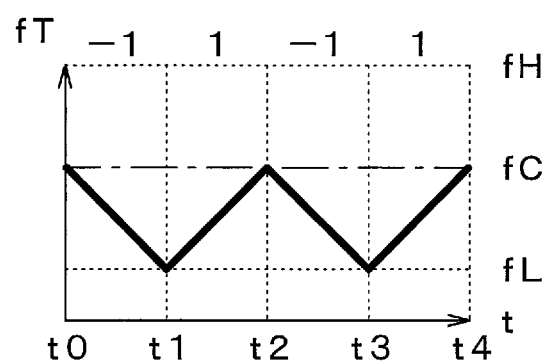
FIG. 3 is a timing chart illustrating transmission and reception frequency characteristics in yet another example of a drive signal output by a drive signal generating unit illustrated in FIG. 1.
Figure 3:
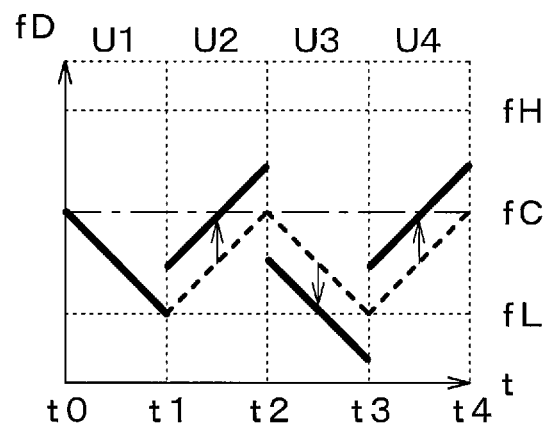
Figure 4:
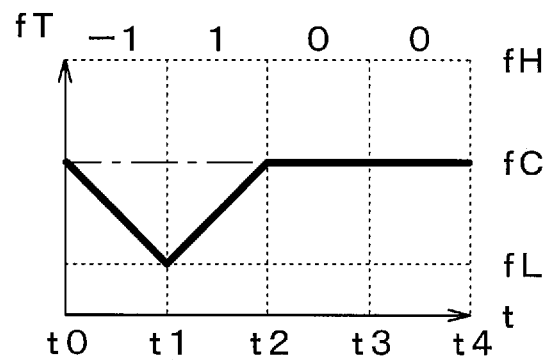
FIG. 4 is a timing chart illustrating transmission and reception frequency characteristics in yet another example of a drive signal output by a drive signal generating unit illustrated in FIG. 1.
Figure 4:
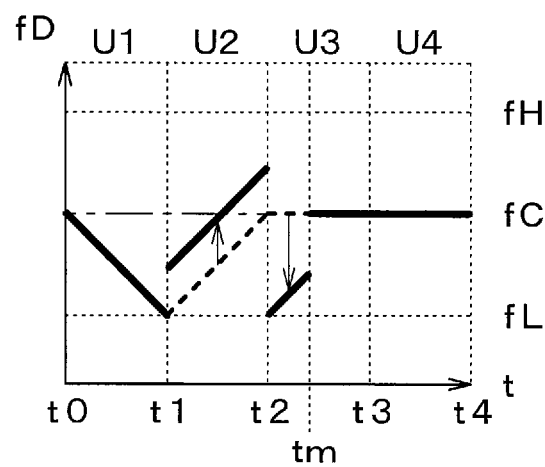
Figure 5:
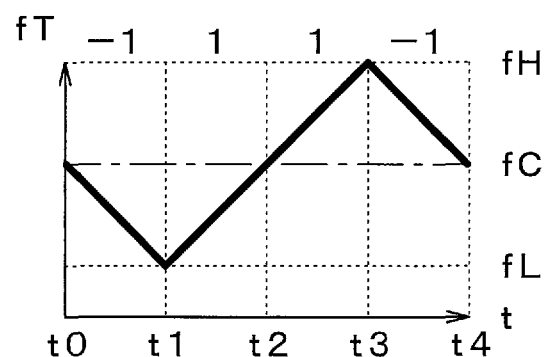
FIG. 5 is a timing chart illustrating transmission and reception frequency characteristics in yet another example of a drive signal output by a drive signal generating unit illustrated in FIG. 1.
Figure 5:
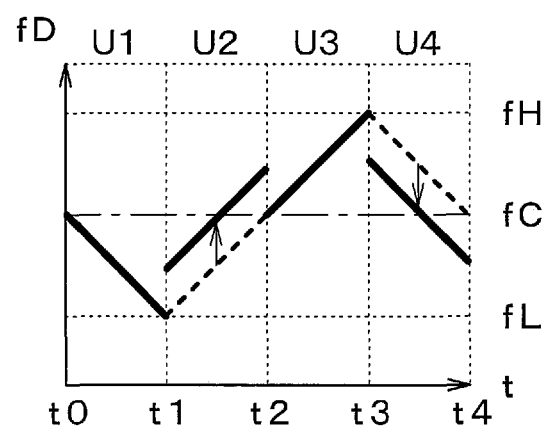

Each of FIGS. 3 to 5 illustrates an example of encoding a transmission wave with a 4-bit code sequence. In each of FIGS. 3 to 5, fT indicates the target frequency and fD indicates the driving frequency. On the timing chart of the driving frequency fD illustrated in the lower part of each of FIGS. 3 to 5, the unit base signal before frequency shift, that is, before correction, is indicated by the heavy dotted line. On the horizontal time axis, t0 indicates the start time of the first bit, corresponding to the first start time ts1 in FIG. 2A. t1 indicates the end time of the first bit and the start time of the second bit. Similarly, t2 indicates the end time of the second bit and the start time of the third bit, t3 indicates the end time of the third bit and the start time of the fourth bit, and t 4 indicates the end time of the fourth bit.

In the examples illustrated in FIGS. 3 to 5, the target frequency corresponding to the code "1" has an "up-chirp" like frequency characteristic where the target frequency monotonically and linearly increases. The target frequency corresponding to the code "−1" has a "down-chirp" like frequency characteristic where the target frequency monotonically and linearly decreases. The target frequency corresponding to the code "0" has a CW wave like frequency characteristic.

Correspondingly, the increasing-in-frequency signal, which is the unit frequency signal corresponding to the code "1", has the "up-chirp" like frequency characteristic where the drive frequency monotonically and linearly increases. The decreasing-in-frequency signal, which is the unit frequency signal corresponding to the code "−1", has the "down-chirp" like frequency characteristic where the drive frequency monotonically and linearly decreases. The CW signal, which is the unit frequency signal corresponding to the code "0", has the CW wave like frequency characteristic where the drive frequency is constant.

In the example illustrated in FIG. 3, the transmission wave is encoded by the code sequence "−1, 1, −1, 1". In this example, the target frequency corresponding to the first bit monotonically and linearly decreases from the resonance frequency fC to the lower limit frequency fL. The target frequency corresponding to the second bit monotonically and linearly increases from the lower limit frequency fL to the resonance frequency fC. The target frequency corresponding to the third bit monotonically and linearly decreases from the resonance frequency fC to the lower limit frequency fL. The target frequency corresponding to the fourth bit monotonically and linearly increases from the lower limit frequency fL to the resonance frequency fC.

Correspondingly, in the base signal, the first unit frequency signal U1 monotonically and linearly decreases from the resonance frequency fC to the lower limit frequency fL. The second unit frequency signal U2 monotonically and linearly increases from the lower limit frequency fL to the resonance frequency fC. The third unit frequency signal U3 monotonically and linearly decreases from the resonance frequency fC to the lower limit frequency fL. The fourth unit frequency signal U4 monotonically and linearly increases from the lower limit frequency fL to the resonance frequency fC. The base signal is formed of the first unit frequency signal U1, the second unit frequency signal U2, the third unit frequency signal U3, and the fourth unit frequency signal arranged in the time series in this order. Unless the frequency shift process is performed, the base signal is almost identical to the frequency signal indicating the frequency characteristics of the drive signal.

At time t1, the target frequency corresponding to the first bit is the lower limit frequency fL. In addition, at time t1, the target frequency corresponding to the second bit is the lower limit frequency fL. Therefore, the target frequency changes continuously at time t1. However, the direction of change of the target frequency corresponding to the first bit and the direction of change of the target frequency corresponding to the second bit are opposite directions. Thus, at time t1, the target frequency changes in the "broken-line" like manner. That is, the first unit frequency signal U1 and the second unit frequency signal U2 following it are switched in the discontinuously switching state.

Therefore, the drive signal generating unit 34 shifts the frequencies in at least a switching portion of the second unit frequency signal U2 in a frequency ascending direction opposite a certain direction of frequency change, that is, a frequency descending direction, in the first unit frequency signal U1. Specifically, the transmission control unit 31 outputs to the drive signal generating unit 34 waveform correction information such that the entire second unit frequency signal U2 having an "up-chirp" like frequency characteristic is offset to higher frequencies.

At time t2, the target frequency corresponding to the second bit is the resonance frequency fC. In addition, at time t2, the target frequency corresponding to the third bit is the resonance frequency fC. Therefore, the target frequency changes continuously at time t2. However, the direction of change of the target frequency corresponding to the second bit and the direction of change of the target frequency corresponding to the third bit are opposite directions. Thus, at time t2, the target frequency changes in the "broken-line" like manner. That is, the second unit frequency signal U2 and the third unit frequency signal U3 following it are switched in the discontinuously switching state.

Therefore, the drive signal generating unit 34 shifts the frequencies in at least a switching portion of the third unit frequency signal U3 in a frequency descending direction opposite a certain direction of frequency change, that is, a frequency ascending direction, in the second unit frequency signal U2. Specifically, the transmission control unit 31 outputs to the drive signal generating unit 34 waveform correction information such that the entire third unit frequency signal U3 having a "down-chirp" like frequency characteristic is offset to lower frequencies.

At time t3, the target frequency corresponding to the third bit is the lower limit frequency fL. In addition, at time t3, the target frequency corresponding to the fourth bit is the lower limit frequency fL. Therefore, the target frequency changes continuously at time t3. However, the direction of change of the target frequency corresponding to the third bit and the direction of change of the target frequency corresponding to the fourth bit are opposite directions. Thus, at time t3, the target frequency changes in the "broken-line" like manner. That is, the third unit frequency signal U3 and the fourth unit frequency signal U4 following it are switched in the discontinuously switching state.

Therefore, the drive signal generating unit 34 shifts the frequencies in at least a switching portion of the fourth unit frequency signal U4 in a frequency ascending direction opposite a certain direction of frequency change, that is, a frequency descending direction, in the third unit frequency signal U3. Specifically, the transmission control unit 31 outputs to the drive signal generating unit 34 waveform correction information such that the entire fourth unit frequency signal U4 having an "up-chirp" like frequency characteristic is offset to higher frequencies.

In the example illustrated in FIG. 4, the transmission wave is encoded by the code sequence "−1, 1, 0, 0". In this example, the target frequency corresponding to the first bit monotonically and linearly decreases from the resonance frequency fC to the lower limit frequency fL. The target frequency corresponding to the second bit monotonically and linearly increases from the lower limit frequency fL to the resonance frequency fC. The target frequency corresponding to each of the third and fourth bits is constant at the resonance frequency fC.

Correspondingly, in the base signal, the first unit frequency signal U1 monotonically and linearly decreases from the resonance frequency fC to the lower limit frequency fL. The second unit frequency signal U2 monotonically and linearly increases from the lower limit frequency fL to the resonance frequency fC. The third unit frequency signal U3 and the fourth unit frequency signal U4 are constant at the resonance frequency fC. The base signal is formed of the first unit frequency signal U1, the second unit frequency signal U2, the third unit frequency signal U3, and the fourth unit frequency signal U4 arranged in the time series in this order.

The target frequencies in the first and second bits are set in the same manner as in the example illustrated in FIG. 3. Therefore, the drive signal generating unit 34 shifts the frequencies in at least a switching portion of the second unit frequency signal U2 in a frequency ascending direction opposite a certain direction of frequency change, that is, a frequency descending direction, in the first unit frequency signal U1. Specifically, the transmission control unit 31 outputs to the drive signal generating unit 34 waveform correction information such that the entire second unit frequency signal U2 having an "up-chirp" like frequency characteristic is offset to higher frequencies.

At time t2, the target frequency corresponding to the second bit is the resonance frequency fC. In addition, at time t2, the target frequency corresponding to the third bit is the resonance frequency fC. Therefore, the target frequency changes continuously at time t2. However, the slope of the change in the target frequency corresponding to the second bit is a positive value that is not zero, while the slope of the change in the target frequency corresponding to the third bit is zero. Thus, at time t2, the target frequency changes in the "broken-line" like manner. That is, the second unit frequency signal U2 and the third unit frequency signal U3 following it are switched in the discontinuously switching state.

Therefore, the drive signal generating unit 34 shifts the frequencies in at least a switching portion of the third unit frequency signal U3 in a frequency descending direction opposite an ascending direction of frequency change in the second unit frequency signal U2. Specifically, the transmission control unit 31 outputs to the drive signal generating unit 34 waveform correction information such that the frequencies in a switching portion of the third unit frequency signal U3 between time t2 and tm are shifted to lower frequencies. The shifted frequency is the lower limit frequency fL at time t2 and increases from the lower limit frequency fL in an "up-chirp" manner between time t2 and tm. The time period between time t2 and tm is set according to the operating temperature and the like.

At time t3, the target frequency corresponding to the third bit is the resonance frequency fC. In addition, at time t3, the target frequency corresponding to the fourth bit is the resonance frequency fC. Furthermore, at and around time t3, the frequency slope of the third unit frequency signal U3 and the frequency slope of the fourth unit frequency signal U4 are both equal to zero. Therefore, the third unit frequency signal U3 and the fourth unit frequency signal U4 following it are switched in the continuously switching state.

Therefore, the drive signal generating unit 34 does not shift the frequency for the fourth unit frequency signal U4. That is, the transmission control unit 31 does not correct the frequency pattern for the fourth unit frequency signal U4.

In the example illustrated in FIG. 5, the transmission wave is encoded by the code sequence "−1, 1, 1, −1". In this example, the target frequency corresponding to the first bit monotonically and linearly decreases from the resonance frequency fC to the lower limit frequency fL. The target frequency corresponding to the second bit monotonically and linearly increases from the lower limit frequency fL to the resonance frequency fC. The target frequency corresponding to the third bit monotonically and linearly increases from the resonance frequency fC to the upper limit frequency fH. The target frequency corresponding to the fourth bit monotonically and linearly decreases from the upper limit frequency fH to the resonance frequency fC.

Correspondingly, in the base signal, the first unit frequency signal U1 monotonically and linearly decreases from the resonance frequency fC to the lower limit frequency fL. The second unit frequency signal U2 monotonically and linearly increases from the lower limit frequency fL to the resonance frequency fC. The third unit frequency signal U3 monotonically and linearly increases from the resonance frequency fC to the upper limit frequency fH. The fourth unit frequency signal U4 monotonically and linearly decreases from the upper limit frequency fH to the resonance frequency fC. The base signal is formed of the first unit frequency signal U1, the second unit frequency signal U2, the third unit frequency signal U3, and the fourth unit frequency signal U4 arranged in the time series in this order.

The target frequencies in the first and second bits are set in the same manner as in the examples illustrated in FIGS. 3 and 4. Therefore, the drive signal generating unit 34 shifts the frequencies in at least a switching portion of the second unit frequency signal U2 in a frequency ascending direction opposite a certain direction of frequency change, that is, a frequency descending direction, in the first unit frequency signal U1. Specifically, the transmission control unit 31 outputs to the drive signal generating unit 34 waveform correction information such that the entire second unit frequency signal U2 having an "up-chirp" like frequency characteristic is offset to higher frequencies.

At time t2, the target frequency corresponding to the second bit is the resonance frequency fC. In addition, at time t2, the target frequency corresponding to the third bit is the resonance frequency fC. Therefore, the target frequency changes continuously at time t2. Furthermore, the frequency slope of the second unit frequency signal U2 and the frequency slope of the third unit frequency signal U3 are both equal to zero at and around time t2. Therefore, the second unit frequency signal U2 and the succeeding third unit frequency signal U3 are switched in the continuously switching state.

Therefore, the drive signal generating unit 34 does not shift the frequency for the third unit frequency signal U3. That is, the transmission control unit 31 does not correct the frequency pattern for the third unit frequency signal U3.

At time t3, the target frequency corresponding to the third bit is the upper limit frequency fH. In addition, at time t3, the target frequency corresponding to the fourth bit is the upper limit frequency fH. Therefore, the target frequency changes continuously at time t3. However, the direction of change of the target frequency corresponding to the third bit and the direction of change of the target frequency corresponding to the fourth bit are opposite directions. Thus, at time t3, the target frequency changes in the "broken-line" like manner. That is, the third unit frequency signal U3 and the fourth unit frequency signal U4 following it are switched in the discontinuously switching state.

Therefore, the drive signal generating unit 34 shifts the frequencies in at least a switching portion of the fourth unit frequency signal U4 in a frequency descending direction opposite an ascending direction of frequency change in the third unit frequency signal U3. Specifically, the transmission control unit 31 outputs to the drive signal generating unit 34 waveform correction information such that the entire fourth unit frequency signal U4 having a "down-chirp" like frequency characteristic is offset to lower frequencies.

Example 2

Figure 6:
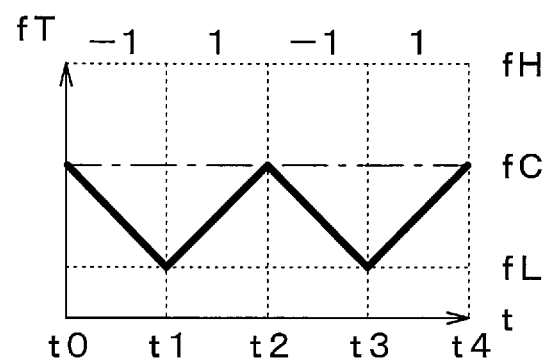
FIG. 6 is a timing chart illustrating transmission and reception frequency characteristics in yet another example of a drive signal output by a drive signal generating unit illustrated in FIG. 1.
Figure 6:
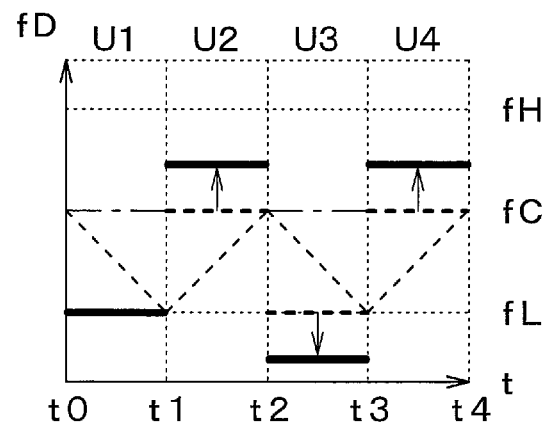
Figure 7:
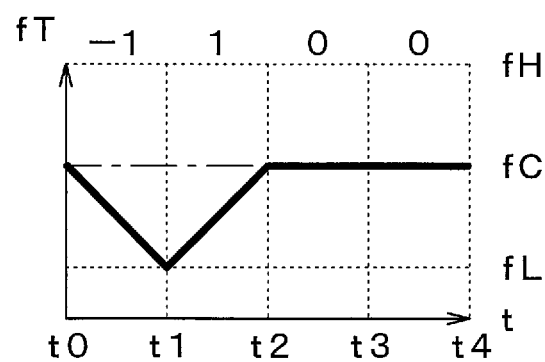
FIG. 7 is a timing chart illustrating transmission and reception frequency characteristics in yet another example of a drive signal output by a drive signal generating unit illustrated in FIG. 1.
Figure 7:
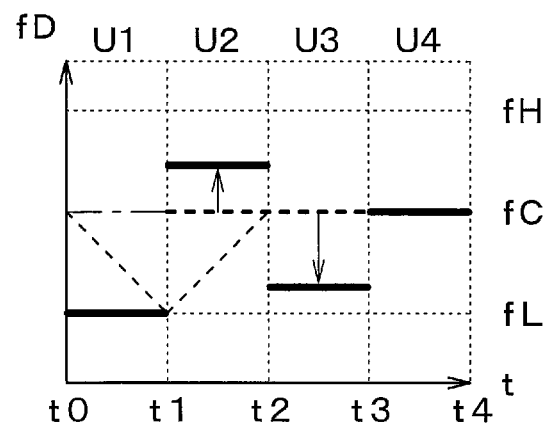
Figure 8:
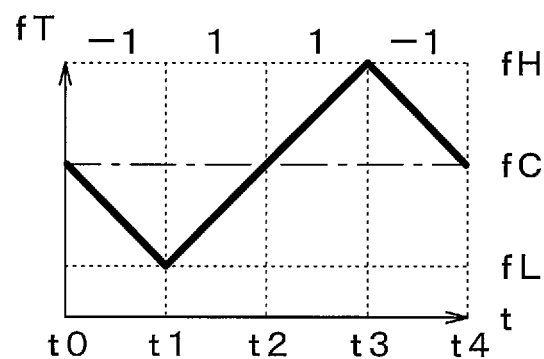
FIG. 8 is a timing chart illustrating transmission and reception frequency characteristics in yet another example of a drive signal output by a drive signal generating unit illustrated in FIG. 1.
Figure 8:
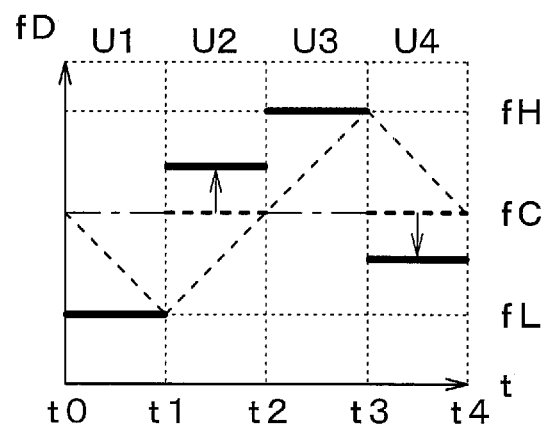

FIGS. 6 to 8 illustrates the drive frequency waveforms in the examples illustrated in FIGS. 3 to 5 modified to waveforms similar to the examples illustrated in FIGS. 2A and 2B. FIG. 6 corresponds to FIG. 3, FIG. 7 corresponds to FIG. 4, and FIG. 8 corresponds to FIG. 5. A waveform corresponding to target values of transmission frequencies fT is indicated by the dashed line on the timing chart of the drive frequency fD illustrated in the lower part of each of FIGS. 6 to 8.

In the example illustrated in FIG. 6, the transmission wave is encoded by the code sequence "−1, 1, −1, 1". In this example, the target frequencies are the same as in the example illustrated in FIG. 3. In the examples illustrated in FIGS. 6 to 8, the drive signal generating unit 34 changes the CW wave-like drive frequency in a stepwise manner, thereby generating a transmission wave such that the transmission frequency changes in an "up-chirp" manner. Similarly, the drive signal generating unit 34 changes the CW wave-like driving frequency in a stepwise manner, thereby generating a transmission wave such that the transmission frequency changes in a "down-chirp" manner.

Specifically, as illustrated in FIG. 6, in the base signal, the first unit frequency signal U1 and the third unit frequency signal U3 are constant at the lower limit frequency fL. The second unit frequency signal U2 and the fourth unit frequency signal U4 are constant at the resonance frequency fC. The base signal is formed of the first unit frequency signal U1, the second unit frequency signal U2, the third unit frequency signal U3, and the fourth unit frequency signal U4 arranged in the time series in this order.

That is, the target frequency corresponding to the first bit monotonically and linearly decreases from the resonance frequency fC to the lower limit frequency fL. The target frequency corresponding to the second bit monotonically and linearly increases from the lower limit frequency fL to the resonance frequency fC. Correspondingly, in the base signal, the first unit frequency signal U1 is set constant at the lower limit frequency fL. The second unit frequency signal U2 is set constant at the resonance frequency fC.

As in the example illustrated in FIG. 3, at time t1, the target frequency changes in the "broken-line" like manner. That is, the first unit frequency signal U1 and the second unit frequency signal U2 following it are switched in the discontinuously switching state.

Therefore, the drive signal generating unit 34 shifts the frequency in at least a switching portion of the second unit frequency signal U2 in a frequency ascending direction that is the same direction as the direction of frequency change from the first unit frequency signal U1 to the second unit frequency signal U2. Specifically, the transmission control unit 31 outputs to the drive signal generating unit 34 waveform correction information such that the entire second unit frequency signal U2 is offset to higher frequencies.

The target frequency corresponding to the second bit monotonically and linearly increases from the lower limit frequency fL to the resonance frequency fC. The target frequency corresponding to the third bit monotonically and linearly decreases from the resonance frequency fC to the lower limit frequency fL. Correspondingly, in the base signal, the second unit frequency signal U2 is set constant at the resonance frequency fC. The third unit frequency signal U3 is set constant at the lower limit frequency fL.

As in the example illustrated in FIG. 3, at time t2, the target frequency changes in the "broken-line" like manner. Therefore, the second unit frequency signal U2 and the third unit frequency signal U3 following it are switched in the discontinuously switching state.

Therefore, the drive signal generating unit 34 shifts the frequency in at least a switching portion of the third unit frequency signal U3 in a frequency descending direction that is the same direction as the direction of frequency change from the second unit frequency signal U2 to the third unit frequency signal U3. Specifically, the transmission control unit 31 outputs to the drive signal generating unit 34 waveform correction information such that the entire third unit frequency signal U3 is offset to lower frequencies.

The target frequency corresponding to the third bit monotonically and linearly decreases from the resonance frequency fC to the lower limit frequency fL. The target frequency corresponding to the fourth bit monotonically and linearly increases from the lower limit frequency fL to the resonance frequency fC. Correspondingly, in the base signal, the third unit frequency signal U3 is set constant at the lower limit frequency fL. The fourth unit frequency signal U4 is set constant at the resonance frequency fC.

As in the example illustrated in FIG. 3, at time t3, the target frequency changes in the "broken-line" like manner. Therefore, the third unit frequency signal U3 and the fourth unit frequency signal U4 following it are switched in the discontinuously switching state.

Therefore, the drive signal generating unit 34 shifts the frequency in at least a switching portion of the fourth unit frequency signal U4 in a frequency ascending direction that is the same direction as the direction of frequency change from the third unit frequency signal U3 to the fourth unit frequency signal U4. Specifically, the transmission control unit 31 outputs to the drive signal generating unit 34 waveform correction information such that the entire fourth unit frequency signal U4 is offset to higher frequencies.

In the example illustrated in FIG. 7, the transmission wave is encoded by the code sequence "−1, 1, 0, 0". In this example, the target frequencies are the same as in the example illustrated in FIG. 4.

As illustrated in FIG. 7, in the base signal, the first unit frequency signal U1 is constant at the lower limit frequency fL. The second unit frequency signal U2 is constant at the resonance frequency fC. The third unit frequency signal U3 and the fourth unit frequency signal U4 are constant at the resonance frequency fC. The base signal is formed of the first unit frequency signal U1, the second unit frequency signal U2, the third unit frequency signal U3, and the fourth unit frequency signal U4 arranged in the time series in this order.

As in the example illustrated in FIG. 4, at time t1, the target frequency changes in the "broken-line" like manner. That is, the first unit frequency signal U1 and the second unit frequency signal U2 following it are switched in the discontinuously switching state.

Therefore, the drive signal generating unit 34 shifts the frequency in at least a switching portion of the second unit frequency signal U2 in a frequency ascending direction that is the same direction as the direction of frequency change from the first unit frequency signal U1 to the second unit frequency signal U2. Specifically, the transmission control unit 31 outputs to the drive signal generating unit 34 waveform correction information such that the entire second unit frequency signal U2 is offset to higher frequencies.

As in the example illustrated in FIG. 4, at time t2, the target frequency changes in the "broken-line" like manner. Therefore, the second unit frequency signal U2 and the third unit frequency signal U3 following it are switched in the discontinuously switching state.

Therefore, the drive signal generating unit 34 shifts the frequency in at least a switching portion of the third unit frequency signal U3 in a frequency descending direction that is the same direction as the direction of frequency change from the second unit frequency signal U2 to the third unit frequency signal U3. Specifically, the transmission control unit 31 outputs to the drive signal generating unit 34 waveform correction information such that the entire third unit frequency signal U3 is offset to lower frequencies.

As in the example illustrated in FIG. 4, at time t3, the target frequency changes continuously at the same slope. Therefore, the third unit frequency signal U3 and the fourth unit frequency signal U4 following it are switched in the continuously switching state. Therefore, the drive signal generating unit 34 does not shift the frequency for the fourth unit frequency signal U4. That is, the transmission control unit 31 does not correct the frequency pattern for the fourth unit frequency signal U4.

In the example illustrated in FIG. 8, the transmission wave is encoded by the code sequence "−1, 1, 1, −1". In this example, the target frequencies are the same as in the example illustrated in FIG. 5.

As illustrated in FIG. 8, in the base signal, the first unit frequency signal U1 is constant at the lower limit frequency fL. The second unit frequency signal U2 is constant at the resonance frequency fC. The third unit frequency signal U3 is constant at the upper limit frequency fH. The fourth unit frequency signal U4 is constant at the resonance frequency fC. The base signal is formed of the first unit frequency signal U1, the second unit frequency signal U2, the third unit frequency signal U3, and the fourth unit frequency signal U4 arranged in the time series in this order.

As in the example illustrated in FIG. 5, at time t1, the target frequency changes in the "broken-line" like manner. That is, the first unit frequency signal U1 and the second unit frequency signal U2 following it are switched in the discontinuously switching state.

Therefore, the drive signal generating unit 34 shifts the frequency in at least a switching portion of the second unit frequency signal U2 in a frequency ascending direction that is the same direction as the direction of frequency change from the first unit frequency signal U1 to the second unit frequency signal U2. Specifically, the transmission control unit 31 outputs to the drive signal generating unit 34 waveform correction information such that the entire second unit frequency signal U2 is offset to higher frequencies.

As in the example illustrated in FIG. 5, at time t2, the target frequency changes continuously at the same slope. Therefore, the second unit frequency signal U2 and the third unit frequency signal U3 following it are switched in the continuously switching state. Therefore, the drive signal generating unit 34 does not shift the frequency for the third unit frequency signal U3. That is, the transmission control unit 31 does not correct the frequency pattern for the third unit frequency signal U3.

As in the example illustrated in FIG. 5, at time t3, the target frequency changes in the "broken-line" like manner. Therefore, the third unit frequency signal U3 and the fourth unit frequency signal U4 following it are switched in the discontinuously switching state.

Therefore, the drive signal generating unit 34 shifts the frequency in at least a switching portion of the fourth unit frequency signal U4 in a frequency descending direction that is the same direction as the direction of frequency change from the third unit frequency signal U3 to the fourth unit frequency signal U4. Specifically, the transmission control unit 31 outputs to the drive signal generating unit 34 waveform correction information such that the entire fourth unit frequency signal U4 is offset to lower frequencies.

As described above, in the examples illustrated in FIGS. 6 to 8, the driving frequency waveform is set in the form of a square wave that changes in a step-like manner. This can implement the desired transmission frequency change in the resonant transceiver 2 in as short a time as possible, thus making it possible to shorten the signal length per bit as much as possible.

Example 3

Figure 9:
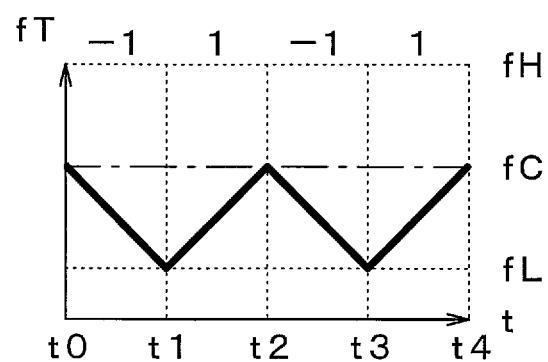
FIG. 9 is a timing chart illustrating transmission and reception frequency characteristics in yet another example of a drive signal output by a drive signal generating unit illustrated in FIG. 1.
Figure 9:
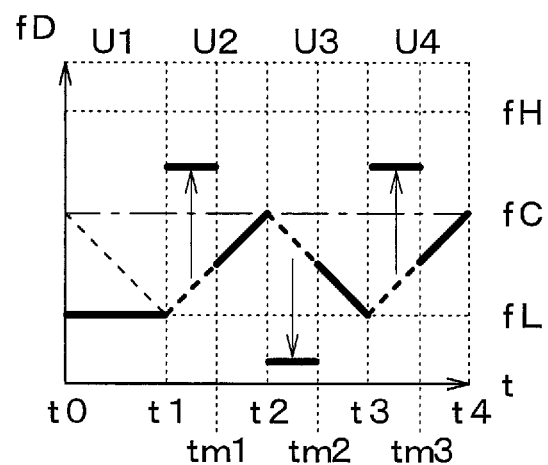

FIG. 9 illustrates a modification to the frequency shift mode in the example illustrated in FIG. 3. In the example illustrated in FIG. 9, the frequencies in a portion other than the switching portion of the unit frequency signal are not shifted, while the frequencies in the switching portion are shifted.

That is, the drive signal generating unit 34 shifts the frequencies in the switching portion of the second unit frequency signal U2 while not shifting the frequencies in the portion other than the switching portion of the second unit frequency signal U2. The switching portion of the second unit frequency signal U2 is a portion of the second unit frequency signal U2 between time t1 and tm1. The portion other than the switching portion of the second unit frequency signal U2 is a portion of the second unit frequency signal U2 between time tm1 and t2.

Similarly, the drive signal generating unit 34 shifts the frequencies in the switching portion of the third unit frequency signal U3 between time t2 and tm2, while not shifting the frequencies in the portion other than the switching portion of the third unit frequency signal U3. In addition, the drive signal generating unit 34 shifts the frequencies in the switching portion of the fourth unit frequency signal U4 between time t3 and tm3, while not shifting the frequencies in the portion other than the switching portion of the fourth unit frequency signal U4.

In such a configuration and a method, switching between two chronologically adjacent codes in time series can be performed rapidly and satisfactorily. Therefore, the characteristics of the reception signal can be made more distinctive. In addition, by making the signal length per bit as short as possible, the number of bits per unit time can be increased, thus making it possible to increase the number of variations of settable code pattern. Therefore, it is possible to improve the identification accuracy more than before.

Example 4

Figure 10:
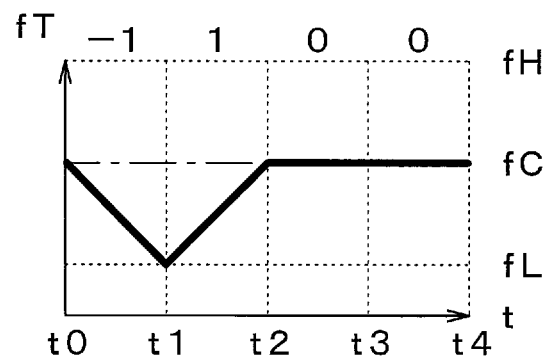
FIG. 10 is a timing chart illustrating transmission and reception frequency characteristics in yet another example of a drive signal output by a drive signal generating unit illustrated in FIG. 1.
Figure 10:
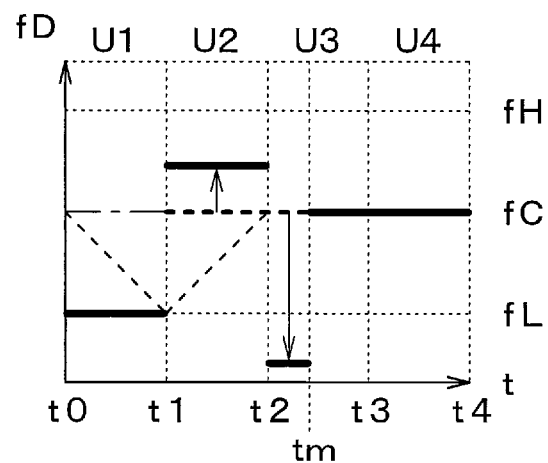

FIG. 10 illustrates a modification to the frequency shift mode in the example illustrated in FIG. 4. In the example illustrated in FIG. 4, the shifted frequency pattern is set such that the frequency monotonically and linearly increases with time in an "up-chirp" manner. In the example illustrated in FIG. 10, the shifted frequency pattern is set to have a fixed frequency signal with no frequency change over time.

That is, the drive signal generating unit 34 sets the shifted frequency in the portion of the second unit frequency signal U2 between time t1 and tm1 to a fixed frequency with no frequency change over time.

Similarly, the drive signal generating unit 34 sets the shifted frequency in the portion of the third unit frequency signal U3 between time t2 and tm2 to a fixed frequency with no frequency change over time. This can implement the desired transmission frequency change in the resonant transceiver 2 in as short a time as possible, thus making it possible to shorten the signal length per bit as much as possible.

Example 5

Figure 11:
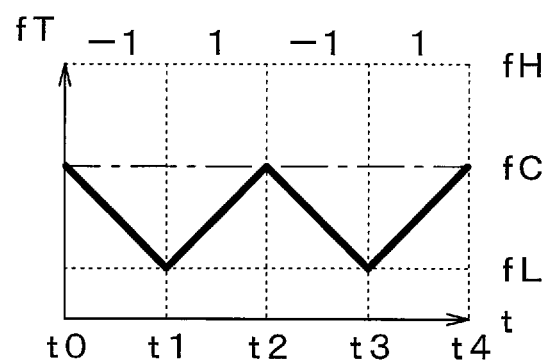
FIG. 11 is a timing chart illustrating transmission and reception frequency characteristics in yet another example of a drive signal output by a drive signal generating unit illustrated in FIG. 1.
Figure 11:
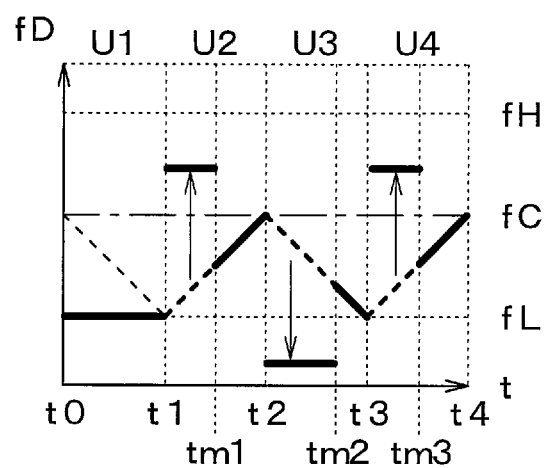

FIG. 11 illustrates a modification to the frequency shift mode in the example illustrated in FIG. 9. In the example illustrated in FIG. 11, the duration of the switching portion in which the frequency is shifted is set to be longer as the difference between the shifted frequency and the resonance frequency fC becomes larger. That is, the drive signal generating unit 34 sets the duration "tm1−t1" between time t1 and tm1, of the portion of the second unit frequency signal U2, to be longer as the difference between the shifted frequency and the resonance frequency fC becomes larger. The resonant frequency fC corresponds to the center frequency in the frequency band of fC to fH for the base signal.

Specifically, referring to FIG. 11, the difference between the shifted frequency and the resonant frequency fC in the portion of the third unit frequency signal U3 between time t2 and tm2 is greater than the difference between the shifted frequency and the resonant frequency fC in the portion of the second unit frequency signal U2 between time t1 and tm1. Therefore, the duration of the switching portion of the third unit frequency signal U3, "tm2−t2", is set greater than the duration of the switching portion of the second unit frequency signal U2, "tm1−t1". This can implement the desired transmission frequency change in the resonant transceiver 2 in as short a time as possible, thus making it possible to shorten the signal length per bit as much as possible.

Example 6

Preferably, as illustrated in FIGS. 6 to 11, the drive signal generating unit 34 sets the frequency after frequency shift to a different frequency from the resonant frequency fC. This enables the desired transmission frequency change in the resonant transceiver 2 to be made in as short a time as possible, thus making it possible to shorten the signal length per bit as much as possible.

Specifically, for example, in the example illustrated in FIG. 11, the target frequency linearly decreases from the resonance frequency fC to the lower limit frequency fL between times t0 and t1, and then the target frequency linearly increases from the lower limit frequency fL to the resonance frequency fC between times t1 and t2. Before and after time t1, ramp-down of the target frequency is followed by ramp-up of the target frequency at the lower limit frequency fL that is far from the resonance frequency fC.

As described above, in the resonant transceiver 2, the resonant transceiver 2 has poor compliance with switching of drive frequencies. Thus, when changing the transmission frequency from a frequency away from the resonant frequency fC toward the resonant frequency fC, it is difficult to acquire sufficient compliance by simply directing the target value toward the resonant frequency fC. Therefore, in such a case, it is necessary to shift the actual drive frequency excessively in the direction where the frequency is to be changed, beyond the preset value in the base signal.

Therefore, the drive signal generating unit 34, between time t1 and tm1, shifts the drive frequency from a preset value before frequency shift, on the lower frequency side than the resonance frequency fC in the base signal, to higher frequencies than the resonance frequency fC. That is, the transmission control unit 31 outputs waveform correction information such that the frequency after frequency shift is on an "opposite" side of the resonance frequency fC from the frequency before frequency shift.

Modifications

The present disclosure is not limited to the above embodiments. Accordingly, changes can be made to the above embodiments as appropriate. Representative examples of variations are described below. In the following description of the variation examples, differences from the above embodiments will mainly be described. In addition, the same number is attached to the parts that are identical or equal to each other in the above embodiments and the variation examples. Therefore, in the following description of the variation examples, the description in the above embodiments may be used as appropriate for the constituent elements having the same numbers as in the above embodiments, unless there is any technical contradiction or special additional explanation.

The vehicle V that the object detection apparatus 1 is mounted to is not limited to an automobile. In addition, the object detection apparatus 1 is not limited to an on-board configuration mounted to the vehicle V. Therefore, specifically, for example, the object detection apparatus 1 may also be mounted to a ship or a flight vehicle.

The object detection apparatus 1 is not limited to a configuration including one transceiver 2 and one drive device 3 as illustrated in FIG. 1. That is, the object detection apparatus 1 may include a plurality of transceivers 2. In this case, the drive device 3 may be configured to perform drive control of the plurality of transceivers 2. Alternatively, the transceiver 2 and the drive device 3 may be provided in a one-to-one relationship.

The object detection apparatus 1 is not limited to the integrated transmission-reception configuration. That is, the object detection apparatus 1 is not limited to a configuration in which ultrasonic waves can be transmitted and received by the single transducer 21. Thus, for example, a transducer 21 for transmission electrically connected to the transmission circuit 22 and a transducer 21 for reception electrically connected to the reception circuit 23 may be provided in parallel. That is, the transmitting unit 20A and the receiving unit 20B may each include one transducer 2. In this case, the transmitting unit 20A and the receiving unit 20B may be supported by separate sensor housings.

A two-dimensional position of an object B relative to the own vehicle may be detected by triangulation using a plurality of transducers 21. For example, a transmission wave having the same frequency characteristic or code sequence may be transmitted from each of the plurality of transducers 21 mounted to the own vehicle. The "proper wave" is a reception wave received at the own vehicle that is a reflected wave of the transmission wave from the own vehicle. On the other hand, the "improper wave" is a reception wave received at the own vehicle that is a reflected wave of the transmission wave from another vehicle. This enables suppression of the effects of interference between multiple vehicles.

According to the present disclosure, the time per bit can be shortened and more code patterns can be transmitted than before. Therefore, for example, a different code pattern can be assigned to each of the plurality of transducers 21 mounted to the own vehicle. Then, each of the plurality of transducers 21 mounted to the own vehicle can transmit a transmission wave having a different frequency characteristic or code sequence. This makes it easy to distinguish between direct and indirect waves, and thus misrecognition due to the effects of multiple reflections and the like can be better suppressed.

The configuration of each of components including the transmission circuit 22, the reception circuit 23, and the like is also not limited to the specific examples described in the above embodiments. That is, for example, the digital-to-analog conversion circuit may be provided in the drive signal generating unit 34 instead of the transmission circuit 22. That is, the drive signal may be the element-input signal itself to the transducer 21.

The whole or part of the drive device 3 may be provided outside a sensor housing (not shown) that supports the transceiver 2 in the ultrasonic sensor. That is, for example, The whole or part of the drive device 3 may be provided in a so-called sonar ECU electrically connected to the ultrasonic sensor. ECU is an abbreviation for Electronic Control Unit.

The code sequence may be changeable or may be unchangeable. That is, for example, the transmission control unit 31 may be configured to change the code sequence to be assigned to the transmission wave in response to the object detecting unit 42 detecting interference. Specifically, for example, the transmission control unit 31 may be configured to select a code sequence different from the code sequence currently selected as the transmission code sequence as a new transmission code sequence in response to the object detecting unit 42 detecting interference. Alternatively, the transmission control unit 31 may cause the code generating unit 32 to generate a code sequence at each startup of the object detection apparatus 1 using a random number or the like.

Alternatively, the drive signal generating unit 34 may be configured to output only one type of drive signal SD for one transceiver 2. Specifically, for example, the drive signal generating unit 34 in the object detection apparatus 1 mounted to the own vehicle may output only a drive signal SD corresponding to the 3-bit code "110". The drive signal generating unit 34 in the object detection apparatus 1 mounted to another vehicle may output only a drive signal SD corresponding to the 3-bit code "100". The drive signal generating unit 34 in the object detection apparatus 1 mounted to still another vehicle may output only a drive signal SD corresponding to the 3-bit code "111". In such an embodiment, the code generating unit 32 can be omitted.

In an embodiment where a plurality of transceivers 2 are provided, the drive signal generating unit 34 may be configured to output a drive signal SD of a different code sequence to each of the plurality of transceivers 34. Specifically, for example, given two transceivers 2, a drive signal SD corresponding to the 3-bit code "110" may be input to one of the transceivers 2, and a drive signal corresponding to the 3-bit code "100" may be input to the other.

fC may be a center frequency in the transmission and reception frequency band between the upper limit frequency fH and the lower limit frequency fL. The center frequency may be a frequency different from the resonance frequency of the transceiver 2.

The code sequences and the corresponding frequency characteristics are not limited to any one of the above specific examples. FIGS. 12 to 17 illustrate other example 4-bit code sequences.

Figure 12:
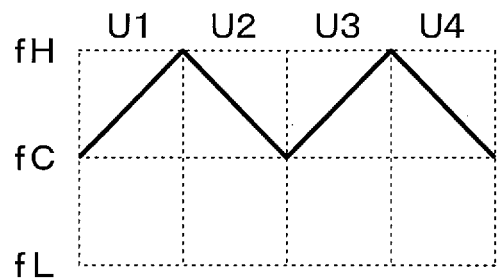
FIG. 12 is a timing chart illustrating an example of a code sequence including four codes.
Figure 13:
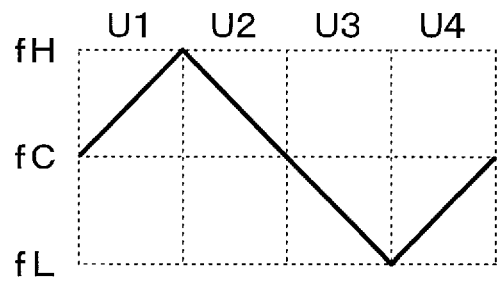
FIG. 13 is a timing chart illustrating another example of a code sequence including four codes.
Figure 14:
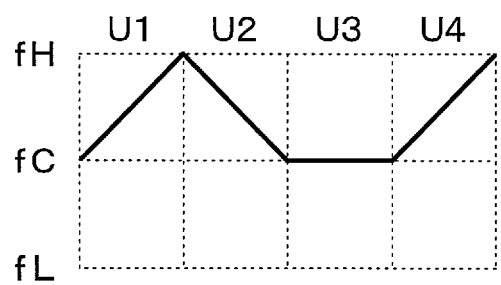
FIG. 14 is a timing chart illustrating yet another example of a code sequence including four codes.
Figure 15:
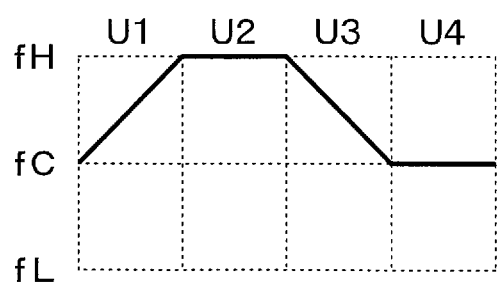
FIG. 15 is a timing chart illustrating yet another example of a code sequence including four codes.

FIG. 12 illustrates the code sequence "1, −1, 1, −1" that is a reversal of the code sequence "−1, 1, −1, 1" illustrated in FIG. 3. FIG. 13 illustrates the code sequence "1, −1, −1, 1" that is a reversal of the code sequence "−1, 1, 1, −1" illustrated in FIG. 5. FIG. 14 illustrates the code sequence "1, −1, 0, 1".

The predefined frequency in the case of the code "0" corresponding to the CW signal is not limited to the resonance frequency fC. For example, the first unit frequency signal U1 corresponding to the code "1" of the first bit in the code sequence "1, 0, −1, 0" illustrated in FIG. 15 monotonically and linearly increases the upper limit frequency fH. The second unit frequency signal U2 corresponding to the code "0" of the second bit is set to be constant at the upper limit frequency fH such that it is continuous with the frequency at the end of the first unit frequency signal U1.

The third unit frequency signal U3 corresponding to the code "−1" of the third bit monotonically and linearly decreases from the upper limit frequency fH to the resonance frequency fC. Thus, the fourth unit frequency signal U4 corresponding to the code "0" of the fourth bit is set to be constant at the resonance frequency fC such that it is continuous with the frequency at the end of the third unit frequency signal U3.

Figure 16:
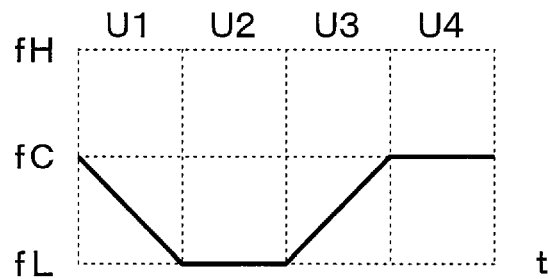
FIG. 16 is a timing chart illustrating yet another example of a code sequence including four codes.

Similarly, the first unit frequency signal U1 corresponding to the code "−1" of the first bit in the code sequence "−1, 0, 1, 0" illustrated in FIG. 16 monotonically and linearly decreases from the resonance frequency fC to the lower limit frequency fL. The second unit frequency signal U2 corresponding to the code "0" of the second bit is set to be constant at the lower limit frequency fL such that it is continuous with the frequency at the end of the first unit frequency signal U1.

The third unit frequency signal U3 corresponding to the code "1" of the third bit monotonically and linearly increases from the lower limit frequency fL to the resonance frequency fC. Thus, the fourth unit frequency signal U4 corresponding to the code "0" of the fourth bit is set to be constant at the resonance frequency fC such that it is continuous with the frequency at the end of the third unit frequency signal U3.

Figure 17:
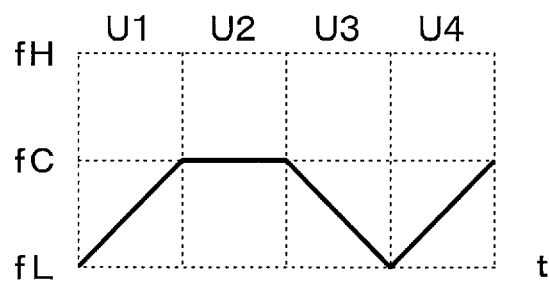
FIG. 17 is a timing chart illustrating yet another example of a code sequence including four codes.

The start frequency of the first bit is not limited to the resonance frequency fC. That is, for example, as illustrated in FIG. 17, the start frequency of the first bit may be the lower limit frequency fL. Alternatively, the start frequency of the first bit may be the upper limit frequency fH. Alternatively, the start frequency of the first bit may be a frequency that differs from any of the upper limit frequency fH, the resonance frequency fC, and the lower limit frequency fL.

As illustrated in FIGS. 3 to 17, in a preferable example, the first bit is not "0" corresponding to a CW wave, which indicates presence of some frequency modulation. This improves the identifiability. However, the present disclosure is not limited to such a mode. That is, for example, the first bit may be "0" corresponding to a CW wave.

In the above embodiments, the example of encoding with three types of codes, "−1", "0", and "1" has been described. However, the present disclosure is not limited to such an encoding mode. That is, for example, "10", "1 1", and "01" may be used instead of "−1", "0", and "1". The code "−1" corresponds to the code "10". The code "0" corresponds to the code "11". The code "1" corresponds to the code "01".

In each of the above-described specific examples, the drive device 3 changes the target frequency in a linear manner. However, the present disclosure is not limited to such a manner. That is, for example, the drive device 3 may change the target frequency in a curvilinear manner. Alternatively, the drive device 3 may change the target frequency in a stepwise manner.

Figure 18:
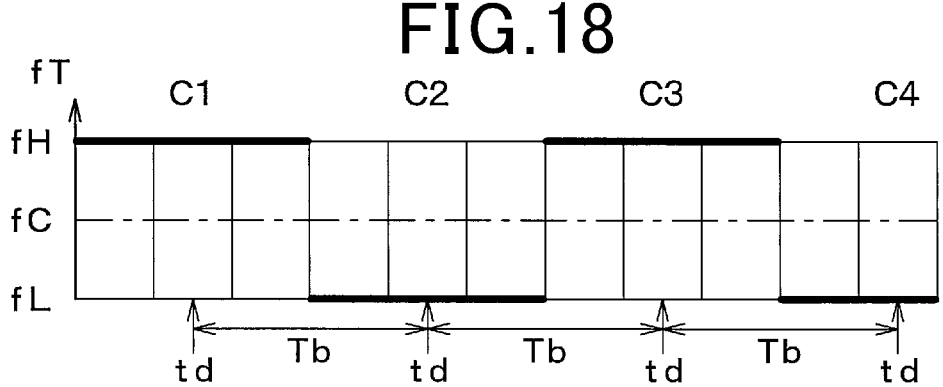
FIG. 18 is a timing chart illustrating an example of an ideal FSK signal.
Figure 19:
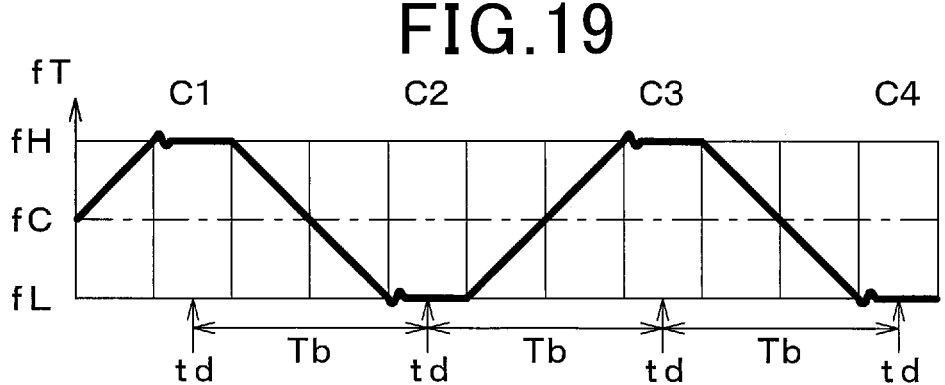
FIG. 19 is a timing chart illustrating an example of an actual FSK signal corresponding to FIG. 18.

FIG. 18 illustrates an example of an ideal FSK signal in sonar. FSK is an abbreviation for Frequency Shift Keying. FIG. 19 illustrates an example of an actual FSK signal corresponding to FIG. 18. In FIGS. 18 and 19, td indicates a bit determination time and Tb indicates a bit determination cycle. C1, C2, C3, and C4 indicate the first, second, third, and fourth bits, respectively.

As mentioned above, since the sonar is of the resonant type, the frequency does not switch rapidly. Thus, as illustrated in FIGS. 18 and 19, when the FSK signal in the sonar switches frequencies, a frequency slope, or a slew rate, occurs. The maximum absolute value of this slew rate depends on the characteristics of the transducer 21 and the transmission and reception circuits. In addition, overshoot occurs at the beginning of each of the upper limit frequency fH and the lower limit frequency fL that are bit determination frequencies. Therefore, it is necessary to set the bit length taking into account the slew rate of the sonar characteristics and the overshoot.

In FSK, it is important to both increase the slew rate and keep the fH and fL frequencies within the fH and fL frequency ranges at the bit determination points. This makes it possible to shorten the signal length by quickly forming constant frequency states at the upper and lower frequencies fH and fL, which are the bit determination frequencies, while increasing the slew rate. Therefore, the present disclosure may be suitably applied to FSK. The "target frequencies" here are indicated by the frequency signal representing the waveform of the ideal FSK signal as illustrated in FIG. 18. The bit determination frequency is limited neither to the upper limit frequency fH nor to the lower limit frequency fL. That is, the bit determination frequency may be within the above transmission and reception frequency band.

Conversion to frequency is not limited to FFT, but of course may be DFT, and its implementation method may be to prepare multiple BPFs for respective frequencies. DFT is an abbreviation for Discrete Fourier Transform. BPF is an abbreviation for Band-pass Filter. The frequency may also be measured from a period of zero crossing time between an AC reception signal and a threshold.

In cases where there are multiple frequency switching points at which the frequency shifting process is to be performed in the transmission process corresponding to a single code sequence, the frequency shifting process does not have to be performed at all of these switching points. That is, it goes without saying that a manner of the frequency shifting process being performed at least once during the transmission process corresponding to a single code sequence is included in the scope of the present disclosure.

Each of the above-described functional configurations and methods may be implemented by a dedicated computer provided by configuring a processor and a memory programmed to implement one or more functions embodied by computer programs. Alternatively, each of the functional configurations and methods described above may be implemented by a dedicated computer provided by configuring a processor with one or more dedicated hardware logic circuits. Alternatively, each of the functional configurations and methods described above may be implemented by one or more dedicated computers configured by combining a processor and a memory programmed to execute one or more functions with a processor configured by one or more hardware logic circuits.

Specifically, the configuration of the drive device 3 is not limited to a configuration as a well-known microcomputer including a CPU or the like. That is, the whole or part of the drive device 3 may be configured as a digital circuit configured to implement the above-described functions, such as an ASIC, e.g., a gate array, or an FPGA. ASIC is an abbreviation for Application Specific Integrated Circuit, and FPGA is an abbreviation for Field Programmable Gate Array.

The computer program may also be stored in a computer-readable non-transitory tangible storage medium as an instruction to be executed by a computer. That is, the apparatus or method of the present disclosure can also be represented as a computer program including procedures for implementing each of the above-described functions or methods, or as a non-transitory tangible storage medium storing said program.

It is needless to say that the elements constituting the embodiments are not necessarily essential unless explicitly stated as essential or obviously considered essential in principle. In addition, when a numerical value such as the number, value, amount, or range of a component(s) of any of the above-described embodiments is mentioned, it is not limited to the particular number or value unless expressly stated otherwise or it is obviously limited to the particular number or value in principle, etc. When the shape, positional relationship, or the like of a component(s) or the like of any of the embodiments is mentioned, it is not limited to the shape, positional relationship, or the like unless explicitly stated otherwise or it is limited to the specific shape, positional relationship, or the like in principle, etc.

The variation examples are also not limited to the above examples. Also, the plurality of variation examples may be combined with each other. Further, all or some of the above embodiments and all or some of the variation examples may be combined with each other.

What is claimed is:

1. A drive device for driving an ultrasonic transmitter whose transmission frequencies are ultrasonic, comprising:
a drive signal generating unit configured to generate a drive signal for driving the ultrasonic transmitter, based on a base signal having a plurality of unit frequency signals arranged in a time series, each of the plurality of unit frequency signals being a frequency signal corresponding to a respective one of a plurality of codes forming a code sequence; and
a transmission control unit configured to control output of the drive signal from the drive signal generating unit to the ultrasonic transmitter,
wherein the drive signal generating unit is configured to, in response to a first unit frequency signal and a second unit frequency signal chronologically adjacent to and following the first unit frequency signal in the time series, both included in the base signal, being switched in a discontinuously switching state that is different from a continuously switching state where the first unit frequency signal and the second unit frequency signal are switched such that a target frequency for the transmission frequency changes continuously at a substantially constant rate of change from the target frequency corresponding to the first unit frequency signal to the target frequency corresponding to the second unit frequency signal, shift the frequency in at least a switching portion of the second unit frequency signal, immediately after start of the second unit frequency signal, in a same direction as a direction of frequency change from the first unit frequency signal to the second unit frequency signal.

2. The drive device according to claim 1, wherein the drive signal generating unit is configured to shift the frequency in the second unit frequency signal in a direction opposite a direction of frequency change in the first unit frequency signal whose frequency changes with time.

3. The drive device according to claim 1, wherein the drive signal generating unit is configured to not shift the frequency in a portion other than the switching portion of the second unit frequency signal, but shift the frequency in the switching portion of the second unit frequency signal.

4. The drive device according to claim 3, wherein the drive signal generating unit is configured to set a duration of the switching portion of the second unit frequency signal to be longer as a difference between the shifted frequency and a center frequency in a frequency band of the base signal becomes larger.

5. The drive device according to claim 1, wherein the drive signal generating unit is configured to set the shifted frequency to a fixed frequency with no frequency change over time.

6. The drive device according to claim 1, wherein the drive signal generating unit is configured to set a frequency shift mode according to an operating temperature of the ultrasonic transmitter.

7. A drive method for driving an ultrasonic transmitter whose transmission frequencies are ultrasonic, comprising:
generating a drive signal for driving the ultrasonic transmitter, based on a base signal having a plurality of unit frequency signals arranged in a time series, each of the plurality of unit frequency signals being a frequency signal corresponding to a respective one of a plurality of codes forming a code sequence; and
in response to a first unit frequency signal and a second unit frequency signal chronologically adjacent to and following the first unit frequency signal in the time series, both included in the base signal, being switched in a discontinuously switching state that is different from a continuously switching state where the first unit frequency signal and the second unit frequency signal are switched such that a target frequency for the transmission frequency changes continuously at a substantially constant rate of change from the target frequency corresponding to the first unit frequency signal to the target frequency corresponding to the second unit frequency signal, shifting the frequency in at least a switching portion of the second unit frequency signal, immediately after start of the second unit frequency signal, in a same direction as a direction of frequency change from the first unit frequency signal to the second unit frequency signal.

8. The drive method according to claim 7, wherein generating the drive signal includes shifting the frequency in the second unit frequency signal in a direction opposite a direction of frequency change in the first unit frequency signal whose frequency changes with time.

9. The drive method according to claim 7, wherein generating the drive signal includes not shifting the frequency in a portion other than the switching portion of the second unit frequency signal, but shifting the frequency in the switching portion of the second unit frequency signal.

10. The drive method according to claim 9, wherein generating the drive signal includes setting a duration of the switching portion of the second unit frequency signal to be longer as a difference between the shifted frequency and a center frequency in a frequency band of the base signal becomes larger.

11. The drive method according to claim 7, wherein generating the drive signal includes setting the shifted frequency to a fixed frequency with no frequency change over time.

12. The drive method according to claim 7, wherein generating the drive signal includes setting a frequency shift mode according to an operating temperature of the ultrasonic transmitter.

* * * * *